United States Patent
Liu et al.

(10) Patent No.: US 12,244,442 B2
(45) Date of Patent: Mar. 4, 2025

(54) SIDELINK INFORMATION SENDING METHOD AND RECEIVING METHOD, TERMINAL, AND CONTROL NODE

(71) Applicant: VIVO MOBILE COMMUNICATION CO., LTD., Guangdong (CN)

(72) Inventors: Siqi Liu, Guangdong (CN); Zichao Ji, Guangdong (CN); Na Li, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 376 days.

(21) Appl. No.: 17/578,812

(22) Filed: Jan. 19, 2022

(65) Prior Publication Data

US 2022/0141058 A1  May 5, 2022

Related U.S. Application Data

(63) Continuation of application No. PCT/CN2020/102698, filed on Jul. 17, 2020.

(30) Foreign Application Priority Data

Jul. 24, 2019 (CN) .......................... 201910673337.1

(51) Int. Cl.
  *H04L 25/03* (2006.01)
  *H04W 72/044* (2023.01)
  *H04W 72/20* (2023.01)
  *H04L 1/1812* (2023.01)

(52) U.S. Cl.
  CPC ..... *H04L 25/03898* (2013.01); *H04W 72/044* (2013.01); *H04W 72/20* (2023.01); *H04L 1/1812* (2013.01)

(58) Field of Classification Search
  CPC ............ H04L 25/03898; H04L 1/1812; H04L 1/1861; H04L 5/001; H04L 5/0053; H04L 5/0055; H04L 5/0057; H04L 2001/0092; H04L 1/1607; H04W 72/044;
  (Continued)

(56) References Cited

U.S. PATENT DOCUMENTS

| | | | |
|---|---|---|---|
| 2019/0149275 A1 | 5/2019 | He et al. | |
| 2020/0092692 A1 | 3/2020 | Wang et al. | |
| 2021/0321380 A1 | 10/2021 | Zhao | |

(Continued)

FOREIGN PATENT DOCUMENTS

| | | |
|---|---|---|
| CN | 107483160 A | 12/2017 |
| CN | 108923894 A | 11/2018 |

(Continued)

OTHER PUBLICATIONS

Huawei, HiSilicon, "Bandwidth Parts and Resource Pools for V2X sidelink", R1-1813555, 3GPP TSG RAN WG1 Meeting #95, Nov. 12-16, 2018, Spokane, USA.

(Continued)

*Primary Examiner* — Austin J Moreau
(74) *Attorney, Agent, or Firm* — Price Heneveld LLP

(57) ABSTRACT

Embodiments of the present disclosure provide a sidelink information sending method and receiving method, a terminal, and a control node. The method includes: obtaining a codebook corresponding to sidelink information based on codebook information; and sending the codebook.

20 Claims, 4 Drawing Sheets

(58) Field of Classification Search
CPC ..... H04W 72/20; H04W 76/14; H04W 92/18; H04W 72/121; H04W 72/23
See application file for complete search history.

(56) References Cited

U.S. PATENT DOCUMENTS

| | | | | |
|---|---|---|---|---|
| 2021/0385029 | A1* | 12/2021 | Guo | H04L 1/1864 |
| 2022/0140958 | A1* | 5/2022 | Zhou | H04L 1/1861 370/329 |

FOREIGN PATENT DOCUMENTS

| | | | |
|---|---|---|---|
| CN | 109792326 | A | 5/2019 |
| CN | 109792369 | A | 5/2019 |
| CN | 109792594 | A | 5/2019 |
| WO | 2019004883 | A1 | 1/2019 |

OTHER PUBLICATIONS

Fraunhofer HHI, Fraunhofer IIS, "Physical Layer Procedures for Unicast and Groupcast", R1-1900355, 3GPP TSG RAN WG1 Meeting AH-1901, Jan. 21-25, 2018, Taipei, Taiwan.

Fraunhofer HHI, Fraunhofer IIS, Physical Layer Procedures for NR V2X, R1-1906653, 3GPP TSG RAN WG1 #97, May 13-17, 2019, Reno, USA.

ITL, "Physical layer structure for NR V2X", 3GPP TSG RAN WG1 #97, R1-197396, Reno, USA, May 13-17, 2019.

VIVO, "Physical layer procedure for NR sidelink", 3GPP TSG RAN WG1 Meeting #95, R1-1812307, Spokane, USA, Nov. 12-16, 2018.

Huaweo, "Summary of remaining issues on bandwidth part and wideband operation", 3GPP TSG RAN WG1 Meeting #92, R1-1801347, Athens, Greece, Feb. 26-Mar. 2, 2018.

Huawei et al., R1-1813554, "Design and contents of PSCCH and PSFCH", 3GPP TSG RAN WG1 #95, 3GPP server publication date (Nov. 3, 2018).

Samsung, R1-1906948, "On Sidelink HARQ Procedure", 3GPP TSG RAN WG1 #97, 3GPP server publication date (May 3, 2019).

VIVO, "Discussion on mode 1 resource allocation mechanism", 3GPP TSG RAN WG1 #96bis, R1-1904073, Xi'an, China, Apr. 8-12, 2019.

* cited by examiner

SIDELINK INFORMATION SENDING METHOD AND RECEIVING METHOD, TERMINAL, AND CONTROL NODE

CROSS-REFERENCE TO RELATED APPLICATIONS

This application is a continuation of PCT Application No. PCT/CN2020/102698 filed on Jul. 17, 2020, which claims priority to Chinese Patent Application No. 201910673337.1, filed on Jul. 24, 2019 in China, the disclosures of which are incorporated herein by reference in their entireties.

TECHNICAL FIELD

The present disclosure relates to the field of communications technologies, and in particular, to a sidelink information sending method and receiving method, a terminal, and a control node.

BACKGROUND

In some communications technologies, terminals may communicate with each other through a PC5 interface on a sidelink (translated as a bypass link, or translated as a direct link, a secondary link, a side link, or an edge link). Further, a control node and a terminal may communicate with each other through a Uu interface on an uplink and a downlink (uplink and downlink). The control node may send scheduling signaling on a downlink to schedule sidelink transmission of the terminal. However, current communications systems do not support feeding back of sidelink information to the control node, where the sidelink information includes at least one of a sidelink hybrid automatic repeat request acknowledgement (HARQ-ACK), a sidelink scheduling request (SR), sidelink channel state information (CSI), and the like. Because sending of the sidelink information is not supported, understanding of the sidelink information may be inconsistent between different sides (for example, the terminal and the control node). Consequently, the control node cannot normally schedule transmission of the terminal, a requirement such as a latency of sidelink transmission cannot be met, and resource utilization is low.

SUMMARY

Embodiments of the present disclosure provide a sidelink information sending method and receiving method, a terminal, and a control node.

According to a first aspect, the embodiments of the present disclosure provide a sidelink information sending method, applied to a terminal and including:
  obtaining a codebook corresponding to sidelink information based on codebook information; and
  sending the codebook.

According to a second aspect, the embodiments of the present disclosure provide a sidelink information receiving method, applied to a control node and including:
  receiving a codebook, where the codebook is a codebook corresponding to sidelink information.

According to a third aspect, the embodiments of the present disclosure provide a terminal, including:
  an obtaining module, configured to obtain a codebook corresponding to sidelink information based on codebook information; and
  a sending module, configured to send the codebook.

According to a fourth aspect, the embodiments of the present disclosure provide a control node, including:
  a receiving module, configured to receive a codebook, where the codebook is a codebook corresponding to sidelink information.

According to a fifth aspect, the embodiments of the present disclosure provide a terminal, including a memory, a processor, and a program that is stored in the memory and that can be run by the processor, where when the program is executed by the processor, the steps of the sidelink information sending method provided in the embodiments of the present disclosure are implemented.

According to a sixth aspect, the embodiments of the present disclosure provide a control node, including a memory, a processor, and a program that is stored in the memory and that can be run by the processor, where when the program is executed by the processor, the steps of the sidelink information receiving method provided in the embodiments of the present disclosure are implemented.

According to a seventh aspect, the embodiments of the present disclosure provide a computer-readable storage medium, where the computer-readable storage medium stores a computer program, and when the computer program is executed by a processor, the steps of the sidelink information sending method provided in the embodiments of the present disclosure are implemented, or when the program is executed by a processor, the steps of the sidelink information receiving method provided in the embodiments of the present disclosure are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present disclosure, the word such as "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the term "example" or "for example" is intended to present a concept in a specific manner.

The embodiments of the present disclosure are described below with reference to the accompanying drawings. A sidelink information sending method and receiving method, a terminal, and a control node provided in the embodiment of the present disclosure may be applied to a wireless communications system. The wireless communications system may be a 5G system, an evolved Long Term Evolution (eLTE) system, a Long Term Evolution (LTE) system, a subsequent evolved communications system, or the like.

Figure 1:
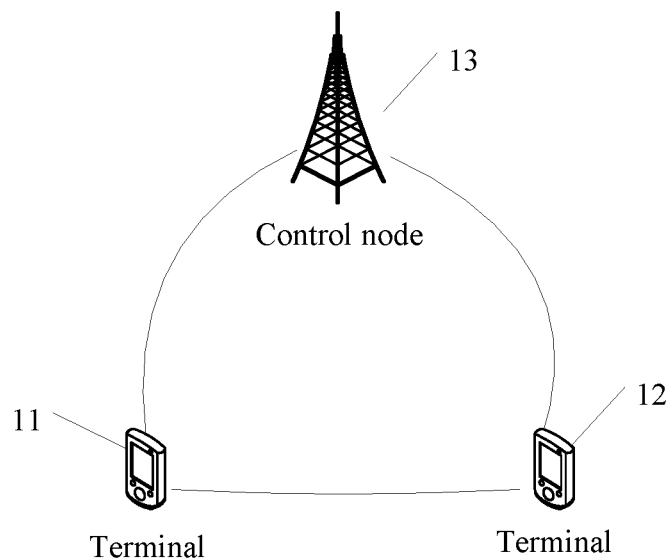
FIG. 1 is a structural diagram of a network system to which the embodiments of the present disclosure can be applied.

Referring to FIG. 1, FIG. 1 is a structural diagram of a network system to which the embodiment of the present disclosure can be applied. As shown in FIG. 1, the network system includes a terminal 11, a terminal 12, and a control node 13. The terminal 11 and the terminal 12 may communicate through a PC5 interface on a sidelink, and the control node 13 and the terminals (including the terminal 11 and the terminal 12) may communicate through a new radio interface (Uu) interface on an uplink and a downlink (uplink and downlink). The terminal 11 and the terminal 12 may be a user equipment (UE) or another terminal side device, for example, a terminal side device such as a mobile phone, a tablet personal computer, a laptop computer, a personal digital assistant (PDA), a mobile internet device (MID), a wearable device, a smart car, an in-vehicle device, or a robot. It should be noted that a specific type of the terminal is not limited in the embodiments of the present disclosure. The control node 13 may be a network device, for example, a 4G base station, a 5G base station, or a base station of a later release, or a base station in another communications system, or may be referred to as a NodeB, an evolved NodeB, or a transmission reception point (TRP), or an access point (AP), or another term in the field. Provided that a same technical effect is achieved, the network device is not limited to a specific technical term. Alternatively, the control node 13 may be some integrated access backhauls (IABs), some sidelink terminals, relays, or road side units (RSUs), or certainly may be some other network facilities similar to the RSU or the IAB. Further, some control nodes 13 may support a sidelink or a Uu link, or may support both a sidelink and a Uu link. This is not limited in the embodiments of the present disclosure. It should be noted that a specific type of the control node 13 is not limited in the embodiments of the present disclosure.

In addition, in a case that the control node is a 4G base station or an LTE base station, the control node may schedule an NR sidelink or an LTE sidelink. When the control node schedules the NR sidelink, a target resource for transmitting a codebook may be an LTE physical uplink control channel (PUCCH) or a physical uplink shared channel (PUSCH) resource.

In addition, in a case that the control node is a 5G base station or a base station of a later release, the control node may schedule an NR sidelink or an LTE sidelink.

Figure 2:
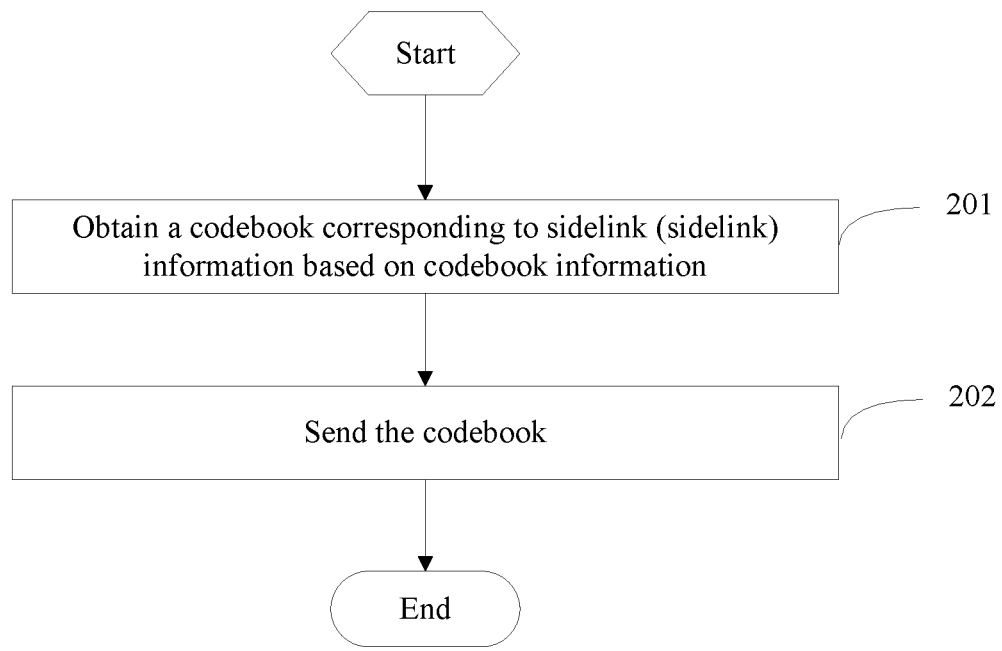
FIG. 2 is a flowchart of a sidelink information sending method according to an embodiment of the present disclosure.

Referring to FIG. 2, FIG. 2 is a flowchart of a sidelink information sending method according to an embodiment of the present disclosure. The method is applied to a terminal. As shown in FIG. 2, the method includes the following steps.

Step 201. Obtain a codebook corresponding to sidelink information based on codebook information.

The codebook information may be related information used to determine configuration of the codebook. In addition, the codebook information may be determined in at least one of the following manners:

being configured by a control node, being predefined by a protocol, being indicated by another terminal, being negotiated between terminals, and being preconfigured.

For example, when the codebook information includes a size, a structure, and position information corresponding to the codebook, these items may be determined in one or more manners. For example, the size corresponding to the codebook is configured by the control node, the structure corresponding to the codebook is predefined by the protocol, and the position information corresponding to the codebook is preconfigured.

The sidelink information may be information related to sidelink transmission. For example, the sidelink information may include at least one of the following:

a sidelink HARQ-ACK, a sidelink SR, and sidelink CSI.

In this embodiment of the present disclosure, the HARQ-ACK information includes one or more status bits, and each status bit indicates a NACK or an ACK.

It should be noted that in this embodiment of the present disclosure, an example in which the sidelink information is the sidelink HARQ-ACK is mainly used for description. For the sidelink SR and the sidelink CSI, refer to corresponding descriptions of the sidelink HARQ-ACK. Details are not described in this embodiment of the present disclosure.

The obtaining a codebook corresponding to sidelink information based on codebook information may be generating or determining the codebook corresponding to the sidelink information based on the codebook information. In addition, the codebook may include sidelink information for a plurality of transmissions.

In addition, the terminal may be a receiving terminal (RX UE) or a transmitting terminal (TX UE) for sidelink transmission, that is, the sidelink information may include:

sidelink information fed back by a receiving user; or
sidelink information determined based on a receiving status of receiving sidelink transmission.

For example, in one case, the TX UE sends sidelink transmission, the RX UE receives the sidelink transmission and determines a corresponding sidelink HARQ-ACK, and the RX UE feeds back the sidelink HARQ-ACK to the TX UE by using a physical sidelink feedback channel (PSFCH) or a physical sidelink shared channel (PSSCH). The TX UE receives a sidelink HARQ-ACK corresponding to at least one sidelink transmission or receives a sidelink HARQ-ACK from at least one RX UE. These pieces of information are sidelink information, and the TX UE sends a codebook corresponding to the sidelink information.

In another case, the RX UE receives at least one sidelink transmission and determines a corresponding sidelink HARQ-ACK. These pieces of information are sidelink information, and the RX UE sends a codebook corresponding to the sidelink information.

Step 202: Send the codebook.

The sending the codebook may be sending the codebook to the control node, or may be sending the codebook information to another terminal, and forwarding the codebook information to the control node by the another terminal. In addition, the codebook may be sent by using a PUCCH, a PUSCH, a PSFCH, or a PSSCH. This is not specifically limited.

In this embodiment of the present disclosure, the codebook may be sent on a target resource, and different codebooks may be sent on different target resources. Certainly, this is not limited. For example, a plurality of codebooks may be sent on a same target resource, for example, the plurality of codebooks are multiplexed on the same target resource. It should be noted that the target resource in this embodiment of the present disclosure may be a resource for sending the codebook, and the target resource may be multiplexed with other information for sending.

For example, when a target resource for sending sidelink information by the terminal overlaps a target resource (for example, an uplink resource PUCCH or PUSCH) for sending HARQ-ACK information transmitted on a corresponding Uu link by the terminal, the terminal multiplexes the sidelink information with the HARQ-ACK information transmitted on the corresponding Uu link, and sends the information to the base station by using the target resource. Alternatively, when a target resource for sending sidelink information (the sidelink information may be referred to as first sidelink information) by the terminal overlaps with a target resource (for example, a sidelink resource PSFCH or PSSCH) for transmitting corresponding sidelink information (the sidelink information may be referred to as second sidelink information) between the terminal and a sidelink control node overlaps, the terminal multiplexes the first sidelink information with the second sidelink information, and sends the information to the sidelink control node by using the target resource.

Figure 3:
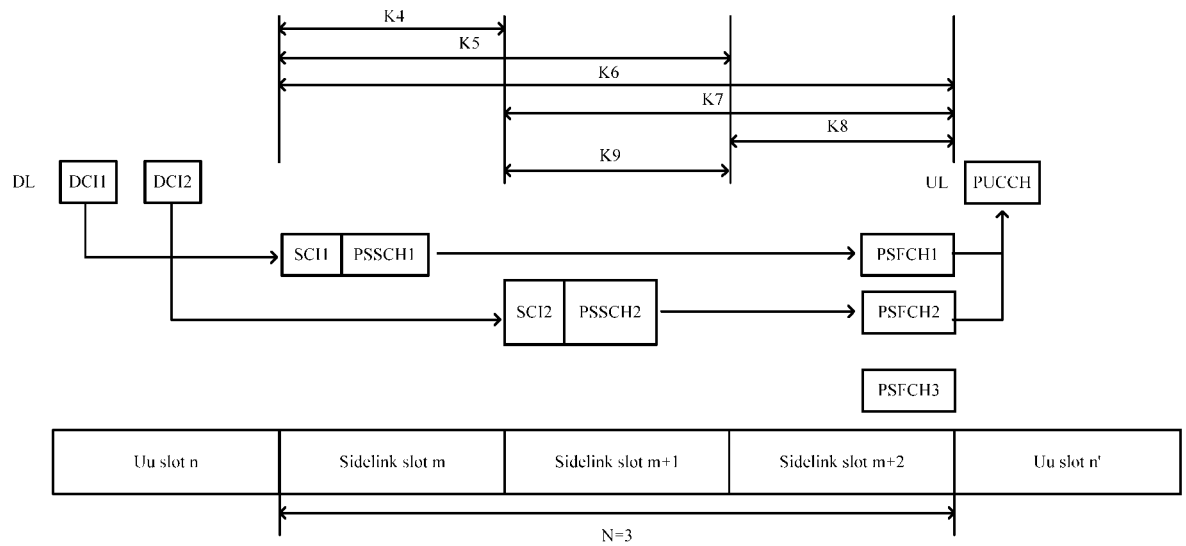
FIG. 3 is a schematic diagram of sidelink transmission according to an embodiment of the present disclosure.

For example, as shown in FIG. 3, a terminal 1 receives downlink control information (DCI) 1 and DCI 2 in a Uu slot n. The DCI 1 is used to schedule the terminal 1 to transmit SCI 1 and a PSSCH 1 in a sidelink slot m, the DCI 2 is used to schedule the terminal 1 to transmit SCI 2 and a PSSCH 2 in a sidelink slot m+1, and a PSFCH 1 corresponding to the SCI 1 and the PSSCH 1 overlaps with a PSFCH 2 corresponding to the SCI 2 and the PSSCH 2 in a sidelink slot m+2. A user receiving the two sidelink transmissions (SCI+PSSCH) may separately feed back sidelink HARQ-ACK information corresponding to the two transmissions on the PSFCH 1 and the PSFCH 2. In addition, the sidelink HARQ-ACK information corresponding to the two transmissions may be multiplexed on a same physical uplink control channel (PUCCH), that is, the transmitting terminal 1 obtains the sidelink HARQ-ACK information on the PSFCH 1 and the PSFCH 2, and sends a corresponding codebook on the PUCCH. A PSFCH 3 may be an idle PSFCH.

It should be noted that, in this embodiment of the present disclosure, the sidelink transmission may be sending or receiving. In addition, the sidelink transmission may be transmission of at least one of sidelink control information (SCI) and data.

In this embodiment of the present disclosure, the codebook corresponding to the sidelink information is sent, so that understanding of sidelink information is consistent between different sides, and a control node can normally schedule transmission of a terminal, to meet a requirement such as a latency of sidelink transmission, and further improve resource utilization. In addition, because the codebook corresponding to the sidelink information is sent, a resource required when a size of the sidelink information sent by the terminal to the control node is relatively large can be reduced, and impact of scheduling by the control node on another link can also be reduced.

In an optional implementation, the codebook information includes at least one of the following information:

a type of a position corresponding to the codebook;

the position corresponding to the codebook;

a structure of the codebook;

traversal information of the position corresponding to the codebook; and a size of the codebook, where the position includes at least one of an occasion and a frequency domain position.

In this embodiment of the present disclosure, one position may correspond to one or more bits in sidelink information, and the numbers of bits corresponding to different positions may be the same or different. The sidelink information in step 201 may be a set of sidelink information of a position corresponding to the foregoing codebook. In addition, at least one target resource (or a codebook transmitted on the target resource) has a corresponding position.

In addition, one occasion may correspond to one or more HARQ-ACK bits in the codebook.

The type of the position corresponding to the codebook may be used to determine which types of positions corresponding to the codebook, for example, an occasion.

The position corresponding to the codebook may be a correspondence between the position and the codebook, and the terminal derives, based on the correspondence, which positions corresponding to a codebook on one target resource, for example, an occasion.

The structure of the codebook may be one codebook, or includes at least two sub-codebooks.

The traversal information of the position corresponding to the codebook may be used to configure how to perform configuration traversal, that is, how to sort positions, so as to determine a sequence correspondence between a bit in the codebook and a position.

The size of the codebook may be a size of a bit number of the sidelink information included in the codebook. For example, after an occasion corresponding to the codebook and a sidelink information (for example, HARQ-ACK) bit number corresponding to each occasion are acquired, the size of the codebook may be determined. In addition, one codebook may be cascading of HARQ-ACK information corresponding to a plurality of sidelink transmissions.

In this implementation, because the codebook information includes at least one of the foregoing items, the codebook of the sidelink information may be accurately determined based on the codebook information. It should be noted that when the codebook information includes only a part of the foregoing plurality of items, a part that is not included in the codebook information may be defined by the protocol or preconfigured. This is not limited thereto.

It should be noted that in this embodiment of the present disclosure, an example in which the position is an occasion is mainly used for description.

The following separately describes content in the foregoing codebook information in detail:

Optionally, the type of the position corresponding to the codebook includes at least one of the following:
- a position of scheduling signaling used to schedule sidelink transmission;
- a position of the sidelink transmission;
- a position of the sidelink information; and
- a subchannel.

The scheduling signaling used to schedule the sidelink transmission may be scheduling signaling sent by a network node, for example, scheduling signaling that is sent by the control node on a downlink and that is used to schedule the sidelink transmission, for example, scheduling signaling sent by a base station, where the signaling may be referred to as sidelink DCI; or may be scheduling signaling that is sent by a sidelink control node on a sidelink and that is used to schedule the sidelink transmission, for example, scheduling signaling sent by a head user, a mode 2d user, a scheduling terminal (scheduling UE), or an RSU, where the signaling may be SCI. This is not limited in this embodiment of the present disclosure.

The following uses an example in which the type of the position corresponding to the codebook includes an occasion of the scheduling signaling used to schedule the sidelink transmission.

For one target resource, the terminal may obtain a correspondence through configuration of the control node, pre-configuration, a definition in a protocol, an indication of another user, negotiation between terminals, or the like, and determine the occasion of the scheduling signaling corresponding to the target resource based on the occasion of the scheduling signaling and the correspondence. For example, configuration of the correspondence includes a time difference K6 between scheduling signaling and a target resource corresponding to sidelink transmission scheduled by using the scheduling signaling. In this case, the terminal deems that there is an association relationship between a target resource at a time point n and an occasion of scheduling signaling at a time point n-K6.

Further, the terminal may determine that there is a correspondence between the target resource and the occasion of the scheduling signaling that is at the time point n-K6 and that is actually received.

Then, for each determined the occasion of the scheduling signaling, the terminal determines HARQ-ACK information corresponding to the occasion, for example, the terminal determines the HARQ-ACK information corresponding to the occasion based on configuration of the occasion. The terminal cascades HARQ-ACK information corresponding to different occasions to obtain a codebook, and sends the codebook on a corresponding target resource, for example, sends the codebook to the control node.

The foregoing sidelink transmission may include sending or receiving. In addition, a same terminal may perform sending at some moments, and perform receiving at other moments. In addition, the position of the foregoing sidelink transmission may include at least one of the following:
- a position of SCI in the sidelink transmission and a position of sidelink data in the sidelink transmission.

The position of the foregoing sidelink transmission includes the position of the SCI in the sidelink transmission and the position of the sidelink data in the sidelink transmission, and the position of the SCI and the position of the sidelink data may be continuous or discontinuous.

The following uses an example in which the type of the position corresponding to the codebook includes an occasion of the sidelink transmission.

For one target resource, the terminal may obtain a correspondence through configuration of the control node, pre-configuration, a definition in a protocol, an indication of another user, negotiation between terminals, or the like, and determine the occasion of the sidelink transmission corresponding to the target resource based on the occasion of the sidelink transmission and the correspondence. For example, configuration of the correspondence includes a time difference K7 between sidelink transmission and a target resource corresponding to the sidelink transmission. In this case, the terminal deems that there is an association relationship between a target resource at a time point n and an occasion of sidelink transmission at a time point n-K7.

Further, the terminal may determine that there is a correspondence between the target resource and the occasion of the sidelink transmission that is at the time point n-K7 and that is actually sent or received.

Then, for a determined occasion of each sidelink transmission, the terminal determines HARQ-ACK information corresponding to the occasion, for example, the terminal determines the HARQ-ACK information corresponding to the occasion based on configuration of the occasion. The terminal cascades HARQ-ACK information corresponding to different occasions to obtain a codebook, and sends the codebook on a corresponding target resource, for example, sends the codebook to the control node.

The position of the sidelink information may be a position of a channel used for transmitting the sidelink information, for example, an occasion of a PSFCH or an occasion of a PSSCH, or may be referred to as an occasion of a sidelink information feedback resource, or may be a candidate position, for example, a candidate occasion.

The following uses an example in which the type of the position corresponding to the codebook includes an occasion of the sidelink information.

For a target resource, the terminal may obtain a correspondence through configuration of the control node, pre-configuration, a definition in a protocol, an indication of another user, negotiation between terminals, or the like, and determine the occasion of the sidelink information corresponding to the target resource based on the occasion of the sidelink information (or an occasion of a sidelink information feedback resource) and the correspondence. For example, configuration of the correspondence includes a time difference K8 between the sidelink information (or the sidelink information feedback resource) and the target resource corresponding to the sidelink transmission. In this case, the terminal deems that there is an association relationship between a target resource at a time point n and an occasion of sidelink information (or an occasion of a sidelink information feedback resource) at a time point n-K8.

Further, the terminal may determine that there is a correspondence between the target resource and the occasion of the sidelink information (or the occasion of the sidelink information feedback resource) that is at the time point n-K8 and that is actually sent or received.

Then, for a determined occasion of each piece of sidelink information (or an occasion of a sidelink information feedback resource), the terminal determines HARQ-ACK information corresponding to the occasion, for example, the terminal determines the HARQ-ACK information corresponding to the occasion based on configuration of the occasion. The terminal cascades HARQ-ACK information corresponding to different occasions to obtain a codebook, and sends the codebook on a corresponding target resource, for example, sends the codebook to the control node.

The subchannel may include at least one of the following: a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Figure 4:
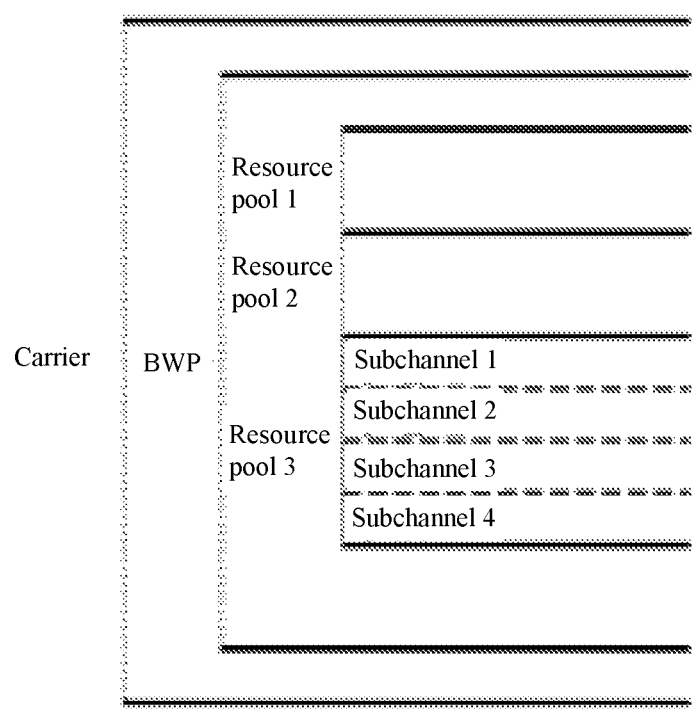
FIG. 4 is a schematic diagram of a resource pool according to an embodiment of the present disclosure.

In this implementation, the subchannel may be a subchannel in a time unit, for example, each subchannel in one slot is one occasion. In addition, the subchannel may be shown in FIG. 4, and each resource pool of an intra-carrier bandwidth part (BWP) may have a plurality of subchannels.

The following uses an example in which the type of the position corresponding to the codebook includes the start subchannel for the sidelink transmission.

For one target resource, the terminal may obtain a correspondence through configuration of the control node, preconfiguration, a definition in a protocol, an indication of another user, negotiation between terminals, or the like, and determine a subchannel corresponding to the target resource based on the subchannel and the correspondence, where each determined subchannel is a start subchannel for one (actual or possible) sidelink transmission. For example, configuration of the correspondence includes a time difference K7 between the subchannel and the target resource. In this case, the terminal deems that there is an association relationship between a target resource at a time point n and a subchannel at a time point n-K7.

Further, the terminal may determine that there is a correspondence between the target resource and a start subchannel for sidelink transmission that is at the time point n-K7 and that actually occurs (is sent or received).

In addition, for each determined start subchannel, the terminal determines HARQ-ACK information corresponding to sidelink transmission corresponding to the subchannel. For example, the user determines the HARQ-ACK information corresponding to the sidelink transmission corresponding to the subchannel based on configuration of the start subchannel. The terminal cascades HARQ-ACK information corresponding to different sidelink transmissions to obtain a codebook, and sends the codebook on a corresponding target resource, for example, sends the codebook to the control node.

Optionally, the type of the position corresponding to the codebook may be obtained in at least one of the following manners: being configured (indicated) by the control node (for example, being configured through one of an SIB, RRC, and scheduling signaling), being predefined by a protocol, being indicated by another terminal, and being preconfigured.

It should be noted that the foregoing position (for example, an occasion or a position) may be a position at which a corresponding signal or channel is actually transmitted, or may be a candidate position. For example, an occasion of sidelink DCI may be an occasion on which the sidelink DCI is actually sent, or may be a candidate occasion on which the sidelink DCI may appear. For another example, an occasion of sidelink transmission may be an occasion on which the sidelink transmission is actually performed, or may be a candidate occasion on which the sidelink transmission is probably performed. In addition, a granularity of the occasion may be a slot or a subslot in which a corresponding channel is located, or an OFDM symbol specifically occupied by a corresponding channel.

Optionally, the position corresponding to the codebook is determined based on a correspondence, and the correspondence includes a correspondence between the codebook and at least one of the following:

a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

The foregoing correspondence may be a correspondence between a codebook and a position, and the correspondence may also be referred to as a correspondence between a target resource and a position. In addition, the correspondence may be obtained in at least one of the following manners: being configured (indicated) by the control node (for example, being configured through at least one of an SIB, RRC, other higher layer signaling, and scheduling signaling), being predefined by a protocol, being indicated by another user, being negotiated between terminals, and being preconfigured. In addition, different terminals may obtain at least a part of the correspondence in different manners, and obtain different parts of the correspondence in different manners. If a same part is obtained, one terminal may send the part to another terminal. This is not limited in this embodiment of the present disclosure. In addition, the foregoing correspondence includes at least one of the foregoing parameter information, and each piece of parameter information may include one group of information (for example, a value) or one piece of information.

The connection may include at least one of a connection type, a connection number, and a connection identifier.

The service information may include at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service.

The identifier of the sidelink service may be a service identifier of the sidelink service, or may be a Qos identifier PQI (PC5 5G QoS Identifier) corresponding to the sidelink service. The data rate of the sidelink service may be at least one of a corresponding PC5 flow bit rate, a PC5 link aggregated bit rate, and a data rate.

The communication range of the sidelink service may be a corresponding minimum communication range requirement, the reliability of the sidelink service may be corresponding transmission reliability, a latency of the sidelink service may be a corresponding maximum end-to-end latency (max end-to-end latency), and the data volume of the sidelink service may be a size of a corresponding packet or a transmitted bit (payload).

In addition, the priority corresponding to the sidelink service may be a priority corresponding to the sidelink service, or may be a priority of transmission corresponding to the sidelink service.

The HARQ process information may include at least one of a sidelink HARQ process number, a sidelink HARQ process identifier, a new radio Uu HARQ process, and a Uu HARQ process identifier.

The carrier information may include at least one of the number of sidelink carriers, an identifier of a sidelink carrier, the number of Uu carriers, and an identifier of a Uu carrier.

The Uu carrier may be a carrier that includes sidelink DCI for scheduling sidelink transmission, or a carrier that includes an occasion of sidelink DCI for scheduling sidelink transmission. For example, a target resource (or a codebook on the target resource) corresponds to an occasion on a primary component carrier (PCC) (for example, a type of the occasion is an occasion of sidelink DCI). For example, a target resource (or a codebook on the target resource) corresponds to occasions on all carriers that include sidelink DCI for scheduling sidelink transmission (for example, a type of the occasion is an occasion of sidelink DCI).

The sidelink carrier may be a carrier that includes an occasion of sidelink scheduling signaling for scheduling sidelink transmission or an occasion of sidelink transmission or an occasion of SCI or an occasion of sidelink data or an occasion of sidelink information. For example, a target resource (or a codebook on the target resource) corresponds to an occasion on a sidelink PCC (Primary Component Carrier) (for example, a type of the occasion is an occasion of a sidelink information feedback resource). For example, a target resource (or a codebook on the target resource) corresponds to occasions on all carriers that include sidelink transmission (for example, a type of the occasion is an occasion of sidelink transmission). For example, a target resource (or a codebook on the target resource) corresponds to an occasion on a carrier that includes an occasion of sidelink information (for example, a type of the occasion is an occasion of sidelink transmission).

It should be noted that a type of an occasion corresponding to a codebook and a type of an occasion used to determine a carrier may be the same or different.

The BWP information may include at least one of the number of sidelink BWPs, an identifier of a sidelink BWP, the number of Uu BWPs, and an identifier of a Uu BWP.

The Uu BWP may be a BWP that includes sidelink DCI for scheduling sidelink transmission, or a BWP that includes an occasion of sidelink DCI for scheduling sidelink transmission.

For example, a target resource (or a codebook on the target resource) corresponds to an occasion on a Uu active downlink BWP (for example, an occasion of sidelink transmission). For another example, a target resource (or a codebook on the target resource) corresponds to an occasion on an initial BWP (for example, a type of the occasion is an occasion of sidelink DCI). For another example, a target resource (or a codebook on the target resource) corresponds to occasions on all active BWPs that include sidelink DCI for scheduling sidelink transmission (for example, a type of the occasion is an occasion of sidelink DCI).

The sidelink BWP may be a sidelink BWP that includes an occasion of sidelink scheduling signaling for scheduling sidelink transmission or an occasion of sidelink transmission or an occasion of SCI or an occasion of sidelink data or an occasion of sidelink information. The sidelink BWP may be an active BWP or an inactive BWP.

For example, a target resource (or a codebook on the target resource) corresponds to an on an active sidelink BWP occasion (for example, a type of the occasion is an occasion of sidelink transmission). For another example, a target resource (or a codebook on the target resource) corresponds to occasions on all sidelink BWPs (for example, a type of the occasion is an occasion of sidelink transmission). A target resource (or a codebook on the target resource) corresponds to an occasion on a sidelink BWP that includes an occasion of sidelink information (for example, a type of the occasion is an occasion of sidelink transmission).

It should be noted that a type of an occasion corresponding to a codebook and a type of an occasion used to determine a BWP may be the same or different.

The resource pool information may include at least one of the number of resource pools, a type of a resource pool, and an identifier of the resource pool.

For example, a target resource (or a codebook on the target resource) corresponds to occasions in one or more resource pools (for example, a type of the occasion is an occasion of sidelink transmission). For another example, a target resource (or a codebook on the target resource) corresponds to occasions in all resource pools (for example, a type of the occasion is an occasion of sidelink transmission). For another example, a target resource (or a codebook on the target resource) corresponds to an occasion in a resource pool with a predetermined resource pool identifier or some predetermined resource pool identifiers (for example, a type of the occasion is an occasion of sidelink transmission). The resource pool may be a sending resource pool, may be a receiving resource pool, or may be a discovery (discovery) resource pool.

The subchannel information may include at least one of a subchannel offset, a reference subchannel, a target subchannel, and a subchannel number.

The target subchannel may be a start subchannel or an end subchannel. The start subchannel may be a start subchannel occupied by a physical sidelink shared channel PSSCH, a physical sidelink control channel PSCCH, or a physical sidelink feedback channel PSFCH, and the end subchannel may be an end subchannel occupied by a PSSCH, a PSCCH, or a PSFCH. Alternatively, the target subchannel may be a $Z^{th}$ subchannel in frequency domain occupied by a PSSCH, a PSCCH, or a PSFCH.

The subchannel offset may be an offset on a subchannel identifier, for example, an offset of N IDs or an offset on a physical resource, or for another example, an offset of N RBs or N subchannels, or an offset based on a specified frequency domain pattern, for example, an offset of N combs.

Taking an example in which the subchannel offset is an offset on a channel identifier and Subchannel offset=2, the reference subchannel is a subchannel of ID=12, and in this case, if the subchannel information includes the two pieces of information, it indicates that a subchannel (that is, a subchannel of ID=14) for which two subchannels are shifted from the reference subchannel of ID=12 corresponds to one occasion.

The subchannel number may be represented by N_S. In addition, the subchannel number may include the number of subchannels included in a carrier, the number of subchannels included in a resource pool, and the number of subchannels included in a channel, where the number of subchannels included in the channel is the number of subchannels occupied by a PSSCH, a PSCCH, or a PSFCH.

The sidelink information feedback resource information may include a sidelink information feedback resource configuration parameter.

For example, the sidelink information feedback resource configuration parameter may be N, and may indicate that each N slots have an occasion or a time domain resource of a PSFCH. For another example, the sidelink information feedback resource configuration parameter may be the number of sidelink information feedback resources on which FDM is performed on a same time domain resource, is represented by N_F, and may indicate that there are N_F FDM PSFCH resources at a same moment.

The user information may include an identifier of a user.

For example, the user information may include at least one of an identifier of a user, an identifier of a header user (header UE), an identifier of a leader user (leader UE), an identifier of a member user (member UE), an identifier of a scheduling user (scheduling UE), an identifier of a scheduled user (scheduled UE), an identifier of a relay user (relay UE), an identifier of a remote user (remote UE), an identifier of a target user (target UE), an identifier of a receiving user (receiving/receiver UE), an identifier of a transmitting user (transmitting/transmitter UE), an identifier of a source user (source UE), and an identifier of a destination user (destination UE). The receiving user is a receiving user of sidelink transmission, the transmitting user is a transmitting user of sidelink transmission, the header user is a header user of a fleet, the leader user is a leader of a user group, the member user is another user who is not the header user in a fleet or another user who is not the leader user in a user group, the scheduling user is a user who schedules transmission of another user, the scheduled user is a user who is scheduled by another user for transmission, the relay user is a user who forwards a message sent by another user, the remote user is a user whose sent message is forwarded by the relay user, the target user is a specified user who participates in a service/a group/a connection/scheduling/transmission, the source user is a transmitting user of specified transmission, and the destination user is a receiving user of specified transmission.

In addition, the identifier of the user may be a multicast group identifier during multicast.

For example, a target resource (or a codebook on the target resource) corresponds to sidelink transmission sent by terminals of a specified identifier or (or some identifiers). For another example, a target resource (or a codebook on the target resource) corresponds to sidelink transmission received by terminals of a specified identifier or (or some identifiers).

It should be noted that, in this embodiment of the present disclosure, the identifiers of the foregoing various users may be specifically the following identifiers:

an ID allocated by the control node to the terminal, a terminal ID predefined by a protocol, a terminal ID preconfigured by a vendor, an ID generated by the terminal based on higher layer information (such as an ID of an application layer, an IP layer, or a MAC layer), an ID generated by the terminal based on configuration of the control node, or a protocol agreement or a preconfigured manner/rule, or a unique identifier associated with the terminal.

The transmission type information includes at least one of a transmission type, a transmission identifier, the number of members in one group during multicast, a maximum number of members in one group during multicast, and a multicast feedback mechanism.

The transmission type may be unicast or multicast, and the transmission identifier may be an ID 1 corresponding to the unicast and an ID 2 corresponding to the multicast. In addition, when unicast and multicast are used for same transmission, even a same receiving user may have different IDs.

The number of members in one group during the multicast may be represented by M_NUM, and the maximum number of members in one group during the multicast may be represented by M_NUM_MAX.

The resource scheduling type information may include at least one of static scheduling, dynamic scheduling, and semi-static scheduling (or referred to as semi-persistent scheduling, semi-static).

The semi-static scheduling type may be a configured sidelink grant.

In addition, the configured sidelink grant may include configured sidelink grants of different types or different IDs, and configured sidelink grants corresponding to different IDs in the semi-static scheduling correspond to different resources, or configured sidelink grants corresponding to different types in the semi-static scheduling correspond to different resources. Certainly, all configured sidelink grants in the semi-static scheduling correspond to one resource.

Information about the foregoing semi-static scheduling type may be an identifier of at least one of the static scheduling, the dynamic scheduling, and the semi-static scheduling.

For example, a target resource (or a codebook on the target resource) corresponds to sidelink transmission on configured sidelink grants corresponding to a specified (some) configured sidelink grant identifier.

The transmission manner information may include at least one of: the number of sidelink transport blocks TBs carried in one sidelink transmission, whether sidelink information corresponding to a plurality of sidelink TBs carried in one sidelink transmission is multiplexed, and a code block group (CBG) configuration in one sidelink transmission.

The number of sidelink TBs carried in one sidelink transmission may be represented by TB_Num. In addition, when TB_Num>1, it may be related to whether feedbacks corresponding to these TBs are multiplexed.

The number of CBGs included in one sidelink TB may be represented by CBG_NUM, and the maximum number of CBGs included in one TB is represented by CBG_NUM_MAX.

The ratio may include a ratio of a target resource to a position, where the target resource is a resource for sending the codebook. For example, one target resource corresponds to L occasions.

The position information may include an identifier of the position corresponding to the target resource for sending the codebook. For example, configuration of a target resource includes an occasion identifier, and a correspondence is established between an occasion and the target resource based on the occasion identifier.

The resource information may include an identifier of the target resource for sending the codebook, and the identifier of the target resource corresponds to a position. For example, configuration of an occasion includes a target resource identifier, and a correspondence is established between the occasion and a target resource based on the target resource identifier.

The latency information includes at least one of the following:

a latency between a position of scheduling signaling and a position of sidelink transmission scheduled by using the scheduling signaling;

a latency between a position of scheduling signaling and a position of a sidelink information feedback resource corresponding to sidelink transmission scheduled by using the scheduling signaling;

a latency between a position of scheduling signaling and a target resource corresponding to sidelink transmission scheduled by using the scheduling signaling, where the target resource is a resource for sending the codebook;

a latency between a position of sidelink transmission and a corresponding target resource, where the target resource is a resource for sending the codebook;

a latency between a sidelink information feedback resource and a corresponding target resource, where the target resource is a resource for sending the codebook; and a latency between a position of sidelink transmission and a corresponding sidelink information feedback resource.

A unit of the latency may be one of a slot, a subslot, a frame, a subframe, a millisecond (ms), a second (s), and the like. The latency may be a time difference of any combination of slots, start symbols, and end symbols on which the two for which there is a latency are located. For example, the latency may be a time difference between a start symbol of a slot in which the former is located and an end symbol of a slot in which the latter is located, or the latency may be a time difference between a start symbol of a slot in which the former is located and a start symbol of a slot in which the latter is located, or the latency may be a latency offset between slots in which the two are located.

The foregoing latency may be calculated based on a sidelink time or a Uu time. Taking a latency between a position of scheduling signaling and a target resource corresponding to sidelink transmission scheduled by using the scheduling signaling as an example, it is assumed that if the latency is a Uu time of 20 ms, and the position of the scheduling signaling is a system frame number SFN (system frame number) 0, the target resource is located in an SFN 2. Taking a latency between a sidelink information feedback resource and a corresponding target resource as an example, it is assumed that if the latency is a sidelink time of 20 ms, and the position of the sidelink information feedback resource is a direct frame number (DFN) 0, the corresponding target resource is located in a DFN 2.

The latency between the scheduling signaling and the sidelink transmission scheduled by using the scheduling signaling may be represented by K4. For example, a time difference between a slot in which DCI is located and a slot in which sidelink transmission scheduled by using the DCI is located may be a difference between start symbols. In addition, a latency may be calculated from a tail of the slot in which the DCI is located, may be calculated from a head of the slot, or may be calculated from a tail of a time domain symbol occupied by the DCI.

For example, there is an association relationship between sidelink transmission at a time point n and an occasion of scheduling signaling at a time point n-K4.

The latency between the scheduling signaling and the sidelink information feedback resource corresponding to the sidelink transmission scheduled by using the scheduling signaling may be represented by K5. For example, there is an association relationship between a sidelink information feedback resource at a time point n and an occasion of scheduling signaling at a time point n-K5.

The latency between the scheduling signaling and the target resource corresponding to the sidelink transmission scheduled by using the scheduling signaling may be represented by K6. For example, there is an association relationship between a target resource at a time point n and an occasion of scheduling signaling at a time point n-K6.

The latency between the sidelink transmission and the corresponding target resource may be represented by K7. For example, there is an association relationship between a target resource at a time point n and an occasion of sidelink transmission at a time point n-K7.

The latency between the sidelink information feedback resource and the corresponding target resource may be represented by K8. For example, there is an association relationship between a target resource at a time point n and an occasion of a sidelink information feedback resource at a time point n-K8.

The latency between the sidelink transmission and the corresponding sidelink information feedback resource may be represented by K9. For example, there is an association relationship between a sidelink information feedback resource at a time point n and an occasion of sidelink transmission at a time point n-K9.

The foregoing different latencies may be combined with each other, to jointly determine some latencies between positions and target resources. For example, a latency between a position of scheduling signaling and a corresponding target resource may be derived based on K4 and K7, to help determine a correspondence between the position of the scheduling signaling and the target resource.

For example, a latency between a position of sidelink transmission and a corresponding target resource may be derived based on K9 and K8, to help determine a correspondence between the position of the sidelink transmission and the target resource.

For example, a latency between a position of scheduling signaling and a corresponding target resource may be derived based on K4, K9, and K8, to help determine a correspondence between the position of the scheduling signaling and the target resource.

Optionally, if a codebook transmitted on one target resource includes a plurality of sub-codebooks, these different sub-codebooks are cascaded to form a codebook finally transmitted on the target resource.

Optionally, the structure of the codebook is one codebook, or the structure of the codebook includes at least two sub-codebooks.

In a case that at least two sub-codebooks are included, the at least two sub-codebooks may be cascaded, interpolated, or the like.

Optionally, the structure of the codebook has at least one of the following features:

different transmission manners correspond to different codebooks or sub-codebooks;

different resource scheduling types correspond to different codebooks or sub-codebooks;

different transmission types correspond to different codebooks or sub-codebooks;

different feedback mechanisms correspond to different codebooks or sub-codebooks;

different users correspond to different codebooks or sub-codebooks;

different resource pools correspond to different codebooks or sub-codebooks;

different carriers correspond to different codebooks or sub-codebooks;

different BWPs correspond to different codebooks or sub-codebooks;

different subchannels correspond to different codebooks or sub-codebooks;

different latencies correspond to different codebooks or sub-codebooks;

different sidelink information feedback resource configurations correspond to different codebooks or sub-codebooks;

different ratios correspond to different codebooks or sub-codebooks;

different HARQ processes correspond to different codebooks or sub-codebooks;

different services correspond to different codebooks or sub-codebooks;

different sidelink information sizes correspond to different codebooks or sub-codebooks; and different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs may respectively correspond to different codebooks or sub-codebooks.

The transmission manner of being configured as a CBG may be performing transmission in a form of a CBG in one transmission.

In this implementation, at least two of the transmission manner of being configured as a single sidelink TB (one sidelink TB is transmitted at a time), the transmission manner of being configured as a CBG (transmission is performed in a form of a CBG in one transmission), and the transmission manner of being configured as TB_Num sidelink TBs (TB_Num sidelink TBs are transmitted at a time) may respectively correspond to different sub-codebooks or codebooks, or HARQ-ACK information corresponding to the three transmission manners belongs to different sub-codebooks or codebooks, and TB_Num is greater than 1.

Optionally, in a case that CBG-based transmission is configured, the transmission manner of being configured as a single sidelink TB and in a form of a CBG and the transmission manner of being configured as a plurality of sidelink TBs and in a form of a CBG respectively correspond to different sub-codebooks or codebooks, or sidelink information corresponding to the transmission manner of being configured as a single sidelink TB and the transmission manner of being configured as a plurality of sidelink TBs belongs to different sub-codebooks or codebooks.

An example in which TB_Num=2 is used for description below.

Optionally, at least two of the transmission manner of being configured as a single sidelink TB (one sidelink TB is transmitted at a time), the transmission manner of being configured as a CBG (transmission is performed in a form of a CBG in one transmission), and the transmission manner of being configured as two sidelink TBs (two sidelink TBs are transmitted at a time) respectively correspond to different sub-codebooks or codebooks, or HARQ-ACK information corresponding to the at least two transmission manners belongs to different sub-codebooks or codebooks.

For example, an occasion in the CBG transmission manner and an occasion in another transmission manner correspond to different codebooks or sub-codebooks. The terminal separately determines codebooks or sub-codebooks corresponding to CBG transmission and non-CBG transmission, and may send the codebooks or sub-codebooks to the control node on a corresponding target resource.

For example, an occasion in the 2 sidelink TB transmission manner and an occasion in the 1 sidelink TB transmission manner correspond to different codebooks or sub-codebooks. The terminal separately determines codebooks or sub-codebooks corresponding to 2 sidelink TB transmission and non-1 sidelink TB transmission, and may send the codebooks or sub-codebooks to the control node on a corresponding target resource.

For another example, if an occasion of the 2 sidelink TB transmission manner that is corresponding to a case that feedback bits are not multiplexed (for example, no space division multiplexing is performed) corresponds to one codebook or sub-codebook, and an occasion of the 1 TB transmission manner and an occasion of the 2 sidelink TB transmission manner that is corresponding to a case that feedback bits are multiplexed (for example, space division multiplexing) correspond to a same codebook or sub-codebook, the terminal separately determines the two codebooks or sub-codebooks, and may send the two codebooks or sub-codebooks to the control node on a corresponding target resource.

That different resource scheduling types correspond to different codebooks or sub-codebooks may be: semi-static scheduling (for example, configured sidelink grant) and dynamic scheduling correspond to different sub-codebooks or codebooks, or HARQ-ACK information corresponding to semi-static scheduling (for example, configured sidelink grant) and dynamic scheduling belongs to different sub-codebooks or codebooks.

For semi-static scheduling (for example, configured sidelink grant), optionally, HARQ-ACK information corresponding to different semi-static scheduling types (for example, configured sidelink grant type1 and type2) belongs to different sub-codebooks or codebooks. Optionally, HARQ-ACK information corresponding to different semi-static scheduling identifiers (for example, a configured sidelink grant ID 1) belongs to different sub-codebooks or codebooks.

For example, configured sidelink grant type1, configured sidelink grant type2, and dynamic scheduling respectively correspond to three codebooks or sub-codebooks. After determining the three codebooks or sub-codebooks, the terminal may send the three codebooks or sub-codebooks to the control node on a corresponding target resource.

For another example, configured sidelink grant type1 and configured sidelink grant type2 correspond to one codebook or sub-codebook, and dynamic scheduling correspond to another codebook or sub-codebook. After determining the two codebooks or sub-codebooks, the terminal may send the two codebooks or sub-codebooks to the control node on a corresponding target resource.

For another example, configured sidelink grants with different configured sidelink grant identifiers correspond to different codebooks or sub-codebooks. After determining each codebook or sub-codebook, the terminal may send the codebook or sub-codebook to the control node on a corresponding target resource.

That different transmission types (cast type) correspond to different codebooks or sub-codebooks may be: multicast and the unicast correspond to different sub-codebooks or codebooks, or HARQ-ACK information corresponding to multicast and unicast correspond to different sub-codebooks or codebooks.

In addition, in a possible special case, when HARQ feedbacks of multicast and unicast are disabled (disable), that is, when corresponding HARQ-ACK information does not need to be determined for multicast and unicast, multicast and unicast may correspond to a same sub-codebook or codebook. For example, when the terminal does not need to perform HARQ-ACK feedback on both multicast and unicast transmission, multicast and unicast may correspond to a same sub-codebook or codebook.

That different feedback mechanisms (connection states) correspond to different codebooks or sub-codebooks may be: different connection states correspond to different sub-codebooks or codebooks.

For example, an occasion using a feedback mechanism 2 (ACK/NACK feedback may be performed in this mechanism, or this mechanism may be referred to as a connection based mechanism, and the method is applicable to a case that a connection is established between a receive end and a transmit end) corresponds to one sub-codebook, and an occasion using a feedback mechanism 1 (only NACK feedback is performed, or this mechanism may be referred to as a connection-less mechanism, and the method is applicable to a case that no connection is established between a receive end and a transmit end) corresponds to another sub-codebook. The mechanism 1 is NACK-only feedback: If the data is received but cannot be decoded, a NACK is fed back, and no feedback is performed in another case. The mechanism 2 is ACK/NACK feedback: If the data is received but cannot be decoded or SCI is received but no data is received, a NACK is fed back, and if the data is received and correctly decoded, an ACK is fed back.

For another example, an occasion using a feedback mechanism 1 and an occasion of unicast correspond to a same sub-codebook.

That different users correspond to different codebooks or sub-codebooks may be: different terminals correspond to different codebooks or sub-codebooks.

Further, different RX UEs corresponds to different sub-codebooks or codebooks, or HARQ-ACK information corresponding to the different RX UEs belongs to different sub-codebooks or codebooks.

For example, HARQ-ACK information fed back by different RX UEs forms different codebooks or sub-codebooks, that is, HARQ-ACK information of an RX UE 1 forms a codebook or sub-codebook 1, HARQ-ACK information of an RX UE 2 forms a codebook or sub-codebook 2 . . . , and HARQ-ACK information of an RX UE R forms a codebook or sub-codebook R.

More specifically, it is assumed that the RX UE 1 feeds back a NACK at a time point t, the RX UE 2 feeds back an ACK at a time point t+1, and the RX UE 1 feeds back a NACK at a time point t+2. A TX user respectively receives the NACK, the ACK, and the NACK at the time point t, the time point t+1, and the time point t+2, and determines two sub-codebooks based on the RX UEs. A sub-codebook 1 corresponds to the RX UE 1 and content is the NACK and the NACK, and a sub-codebook 2 corresponds to the RX UE 2 and content is the ACK.

Further, if HARQ-ACK information of different RX UEs corresponds to different sub-codebooks, after receiving the HARQ-ACK information fed back by the RX UE, the TX UE determines different sub-codebooks by using the HARQ-ACK information based on the corresponding RX UEs, and may cascade these sub-codebooks into a codebook and send the codebook to the control node.

For another example, different TX UEs corresponds to different sub-codebooks or codebooks, or HARQ-ACK information corresponding to the different TX UEs belongs to different sub-codebooks or codebooks.

For example, an RX UE 0 receives sidelink transmission from R different TX UEs, and HARQ-ACK information corresponding to sidelink data sent by different TX UEs forms different sub-codebooks. HARQ-ACK information corresponding to a TX UE 1 forms a sub-codebook 1, HARQ-ACK information corresponding to a TX UE 2 forms a sub-codebook 2 . . . , and HARQ-ACK information corresponding to a TX UE R forms a sub-codebook R.

That is, HARQ-ACK information corresponding to a same terminal is arranged together to form one sub-codebook or codebook.

That different resource pools correspond to different codebooks or sub-codebooks may be: different resource pools correspond to different sub-codebooks or codebooks, or HARQ-ACK information corresponding to the different resource pools belongs to different sub-codebooks or codebooks. For example, resource pools of different resource pool types or different resource pool identifiers correspond to different sub-codebooks or codebooks.

That different carriers correspond to different codebooks or sub-codebooks may be: carriers of different types correspond to different codebooks or sub-codebooks, and/or different carriers of a same type correspond to different codebooks or sub-codebooks.

The carrier may be defined in at least one of the following manners:

A carrier on which sidelink transmission is located is referred to as a sidelink transmission carrier. For example, different sidelink transmission carriers correspond to different sub-codebooks or codebooks, or HARQ-ACK information corresponding to the different sidelink transmission carriers belongs to different sub-codebooks or codebooks. In this case, data and SCI in transmission may be on a same carrier. Certainly, in some cases, the data and the SCI may be on different carriers.

A carrier on which SCI in sidelink transmission is located is referred to as a sidelink control carrier. For example, different sidelink control carriers correspond to different sub-codebooks or codebooks, or HARQ-ACK information corresponding to the different sidelink control carriers belongs to different sub-codebooks or codebooks.

A carrier on which a data part (PSSCH) in sidelink transmission is located is referred to as a sidelink control carrier. For example, different sidelink control carriers correspond to different sub-codebooks or codebooks, or HARQ-ACK information corresponding to the different sidelink control carriers belongs to different sub-codebooks or codebooks.

A carrier on which a sidelink information feedback resource corresponding to sidelink transmission is referred to as a sidelink feedback carrier. For example, different sidelink feedback carriers correspond to different sub-codebooks or codebooks, or HARQ-ACK information corresponding to the different sidelink feedback carriers belongs to different sub-codebooks or codebooks.

A carrier on which scheduling signaling for scheduling sidelink transmission is referred to as a scheduling carrier. For example, different scheduling carriers correspond to different sub-codebooks or codebooks, or HARQ-ACK information corresponding to the different scheduling carriers belongs to different sub-codebooks or codebooks.

For example, when an occasion corresponding to a codebook is an occasion of sidelink DCI, different scheduling carriers that carry the sidelink DCI correspond to different sub-codebooks or codebooks, or HARQ-ACK information corresponding to the different scheduling carriers belongs to different sub-codebooks or codebooks.

For another example, when a sidelink control node schedules sidelink transmission by using scheduling signaling, and an occasion corresponding to a codebook is an occasion of the scheduling signaling, the scheduling signaling is transmitted on a sidelink. Different scheduling carriers (sidelink carriers in this case) that carry the scheduling signaling correspond to different sub-codebooks or codebooks, or HARQ-ACK information corresponding to the different scheduling carriers belongs to different sub-codebooks or codebooks.

In addition, optionally, a primary component carrier PCC and a secondary component carrier (SCC) may also correspond to different sub-codebooks or codebooks. If there is a plurality of SCCs, the PCC corresponds to one sub-codebook or codebook, and the SCCs may correspond to one or more sub-codebooks or codebooks.

That different BWPs correspond to different codebooks or sub-codebooks may be: BWPs of different types correspond to different codebooks or sub-codebooks, or each BWP corresponds to a respective codebook or sub-codebook.

That different subchannels correspond to different codebooks or sub-codebooks may be: each subchannel corresponds to a respective codebook or sub-codebook.

That different latencies correspond to different codebooks or sub-codebooks may be: each latency corresponds to a respective codebook or sub-codebook.

The different sidelink information feedback resource configurations correspond to different codebooks or sub-codebooks may be: each sidelink information feedback resource configuration corresponds to a respective codebook or sub-codebook.

That different ratios correspond to different codebooks or sub-codebooks may be: each ratio corresponds to a respective codebook or sub-codebook.

That different HARQ processes correspond to different codebooks or sub-codebooks may be: each HARQ process corresponds to a respective codebook or sub-codebook.

That different services correspond to different codebooks or sub-codebooks may be: different service information corresponds to different codebooks or sub-codebooks, for example, the foregoing different service identifiers or types or service priorities correspond to different codebooks or sub-codebooks, or each service corresponds to a respective codebook or sub-codebook.

That different sidelink information sizes correspond to different codebooks or sub-codebooks may be: each sidelink information bit size value corresponds to a respective codebook or sub-codebook. For example, for an occasion set 1, sidelink information corresponding to each occasion is P bits, and for another occasion set 2, sidelink information corresponding to each occasion is Q bits. In this case, the set 1 and the set 2 correspond to two different codebooks or sub-codebooks.

That different connections correspond to different codebooks or sub-codebooks may be: different connections (sessions or connections) correspond to respective codebooks or sub-codebooks. For example, a UE 1 establishes four sidelinks, and enables a HARQ-ACK feedback on each connection, that is, transmission on each connection has corresponding HARQ-ACK information. In this case, HARQ-ACK information on different connections separately forms different codebooks or sub-codebooks.

It should be noted that for a target resource, the terminal may determine a codebook structure of a codebook on the target resource based on structure configuration. In addition, the terminal (or the control node) determines a size of sidelink information fed back for each occasion, to further determine a size of a corresponding codebook or sub-codebook.

Optionally, when the control node schedules sidelinks in different access technologies, the sidelinks in the different access technologies correspond to different sub-codebooks or codebooks. For example, when the control node supports scheduling of both an NR sidelink and an LTE sidelink, the NR sidelink and the LTE sidelink correspond to different codebooks, and the codebooks are sent on different target resources.

Optionally, the traversal information of the position corresponding to the codebook is used to determine a sequence correspondence between a bit in the codebook and a position.

A position corresponding to each bit in the foregoing codebook, such as an occasion corresponding to each bit, may be determined by using the foregoing sequence correspondence.

Optionally, the traversal information of the position corresponding to the codebook includes a dimension of a traversed position, and the dimension includes at least one of the following:
 a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain frequency division multiplexing (FDM) number, and a feedback mechanism.

It should be noted that, in this embodiment of the present disclosure, a sequence of traversing the plurality of dimensions is not limited.

In addition, a sequence correspondence between a bit and an occasion (or a bit and sidelink transmission) in the codebook includes at least one of the following cases:

Case 1: One or more resource pools exist, and the target resource is used to send sidelink information on one resource pool. The resource pool herein may be predefined, preconfigured, configured by the control node, negotiated between users, or indicated by another user.

Case 2: One or more carriers exist, and the target resource is used to send sidelink feedback information on one sidelink carrier. The carrier herein may be predefined, preconfigured, configured by the control node, negotiated between users, or indicated by another user. In addition, the target resource may correspond to one or more resource pools on the carrier.

Case 3: A plurality of carriers exist, and the target resource is used to send sidelink feedback information on at least two sidelink carriers. In addition, the target resource may correspond to one or more resource pools on each carrier.

Further, the target resource is used to send a codebook corresponding to sidelink information of one terminal; or
 the target resource is used to send a codebook corresponding to sidelink information of all terminals or all receiving terminals in one terminal group; or
 the target resource is used to send a codebook corresponding to sidelink information in one resource pool; or
 the target resource is used to send a codebook corresponding to sidelink information on one sidelink carrier; or
 the target resource is used to send a codebook corresponding to sidelink information on at least two carriers.

In a case that the traversal dimension includes a connection, occasions of connections may be traversed successively based on IDs of the connections or a connection establishment sequence. For example, the connections are traversed in ascending order of IDs, and then the occasions of the connections are traversed.

In a case that the traversal dimension includes a connection, traversing may be performed based on a connection type, a connection identifier, or the like.

In a case that the traversal dimension includes a ratio, occasions corresponding to ratios may be traversed based on sizes of the ratios. For example, traversing is performed in ascending order of ratios.

In a case that the traversal dimension includes a service, occasions of services may be traversed based on service information. For example, traversing is performed in ascending order of IDs or priorities.

In a case that the traversal dimension includes a HARQ process, occasions on HARQ processes may be traversed based on IDs of the HARQ processes. For example, traversing is performed in ascending order of IDs.

In a case that the traversal dimension includes a carrier, occasions on carriers may be traversed based on IDs of the carriers. For example, traversing is performed in ascending order of IDs.

In a case that the traversal dimension includes a BWP, occasions on BWPs may be traversed based on IDs of the BWPs.

In a case that the traversal dimension includes a latency, occasions corresponding to values of K may be traversed based on a value of a latency K. For example, traversing is performed in descending order of values of K.

In a case that the traversal dimension includes a resource pool, occasions on resource pools may be traversed based on IDs of the resource pools.

In a case that the traversal dimension includes a subchannel, occasions on subchannels may be traversed based on frequency domain of the subchannels. For example, traversing is performed in ascending order of frequency domain.

In a case that the traversal dimension includes a sidelink information feedback resource, occasions may be traversed based on corresponding sidelink information feedback resources. For example, occasions on sidelink information feedback resources are traversed successively.

In a case that the dimension includes scheduling, traversing is performed based on a scheduling identifier such as a configured sidelink grant ID and/or a scheduling signaling identifier.

In a case that the traversal dimension includes a position, traversing may be performed based on at least one of a position identifier (occasion identifier), time domain, and frequency domain. For example, occasions are traversed based on a time sequence of the occasions.

In a case that the traversal dimension includes a position frequency domain FDM number, occasions may be traversed based on frequency domain of occasions of FDM. For example, traversing is performed in ascending order of frequency domain of occasions.

In a case that the traversal dimension includes a transmission manner, occasions may be traversed in different transmission manners. For example, traversing is performed in a sequence of 1 TB, multi-TB, and CBG In a case that the traversal dimension includes a resource scheduling type, occasions may be traversed based on different resource scheduling types. Traversing may be performed in a sequence of dynamic scheduling, configured sidelink grant, and static scheduling. Dynamic scheduling is first traversed, then configured sidelink grant is traversed, and static scheduling is finally traversed. Further, different resource identifiers (for example, a configured sidelink grant ID 1 and a configured sidelink grant ID 2) correspond to different traversal sequences. It should be noted that one configured sidelink grant may include a plurality of occasions. Certainly, this is not limited. For example, one configured sidelink grant may include only one occasion.

In a case that the traversal dimension includes a transmission type (cast type), occasions may be traversed based on different transmission types.

In a case that the traversal dimension includes a feedback mechanism, occasions may be traversed based on different feedback mechanisms.

In a case that the traversal dimension includes a user, traversing may be performed based on different users. For example, for a TX UE, occasions may be traversed based on different TX UEs, for example, traversing is performed in ascending order of IDs of the TX UEs. More specifically, a TX UE 1 sends two sidelink transmissions to an RX UE at moments t+1 and +4, and the RX UE determines that HARQ-ACK information for the two transmissions is an ACK and a NACK. A TX UE 2 sends one sidelink to the RX UE at a moment t+3, and the RX UE determines that HARQ-ACK information for the transmission is an ACK. During traversal, the RX UE traverses two occasions corresponding to the TX UE 1 (that is, occasions of the sidelink transmissions at the moments t+1 and t+4), and then traverses one occasion corresponding to the TX UE 2 (that is, an occasion of the sidelink transmission at the moment t+3). Further, optionally, HARQ-ACK bits corresponding to the three occasions in the codebook indicate the ACK, the NACK, and the ACK, and respectively correspond to occasions at the moments t+1, t+4, and t+3. For example, for an RX UE, occasions may be traversed based on different RX UEs, for example, traversing is performed based on IDs of the RX UEs. More specifically, one TX UE sends two sidelink transmissions to two RX UEs. An RX UE 1 separately feeds back HARQ-ACK information for the two transmissions at moments t+1 and t+4, which are respectively an ACK and an ACK. An RX UE 2 separately feeds back HARQ-ACK information for the two transmissions at moments t+2 and t+5, which are respectively a NACK and a NACK. During traversal, the TX UE first traverses two occasions corresponding to the RX UE 1 (that is, occasions of sidelink information at the moments t+1 and t+4), and then traverses two occasions corresponding to the RX UE 2 (that is, occasions of sidelink information at the moments t+2 and t+5). Further, optionally, HARQ-ACK bits corresponding to the four occasions in the codebook indicate the ACK, the ACK, the NACK, and the NACK, and respectively correspond to occasions at the moments t+1, t+4, t+2, and t+5.

Optionally, an occasion may be numbered based on the foregoing traversal dimension and/or traversal sequence.

The following uses the foregoing three cases as examples for description.

An example in which one or more resource pools exist but the target resource is only used to send sidelink information on one resource pool in the foregoing case 1 is used:

1. An occasion of scheduling signaling used to schedule sidelink transmission:
   If a target resource at a time point n corresponds to an occasion of sidelink DCI at a time point n-K6, a corresponding occasion in a codebook is determined by using at least a part of the following method:
   A carrier on which sidelink DCI/PDCCH is located is traversed (a carrier on which scheduling signaling is located is traversed); and
   An occasion is traversed based on a value of n-K6 (that is, K6 is traversed).

It should be noted that in this embodiment of the present disclosure, Kx may be a group of values. For example, K6 may be a group of values, or certainly, may be one value.

2. If the occasion is an occasion of sidelink transmission:
   If a target resource at a time point n corresponds to an occasion of sidelink transmission at a time point n-K7, a corresponding occasion in a codebook is determined by using at least a part of the following method:
   A subchannel in a resource pool is traversed; and
   An occasion of sidelink transmission is traversed based on a value of n-K7 (that is, K7 is traversed).

It should be noted that SCI and a PSSCH may be located in a same slot, but the SCI and the PSSCH may be located in different slots. In addition, if a latency is calculated as an example of a symbol level, a latency K7 between the SCI and the PSSCH is also different.
3. If the occasion is an occasion of SCI (PSCCH):
If a target resource at a time point n corresponds to an occasion of SCI at a time point n-K7, a corresponding occasion in a codebook is determined by using at least a part of the following method:
A subchannel in a resource pool is traversed; and
An occasion of SCI is traversed based on a value of n-K7 (that is, K7 is traversed).
4. If the occasion is an occasion of a PSSCH:
If a target resource at a time point n corresponds to an occasion of a PSSCH at a time point n-K7, a corresponding occasion in a codebook is determined by using at least a part of the following method:
A subchannel in a resource pool is traversed; and
An occasion of a PSSCH is traversed based on a value of n-K7 (that is, K7 is traversed).
There may be one or more PSSCH occasions in time domain corresponding to each n-K7. If there may be a plurality of PSSCH occasions in time domain corresponding to each n-K7, these occasions are classified into different overlapping occasion groups.
It should be noted that, for the examples 2, 3, and 4, values of K7 may be different or the same.
5. If the occasion is an occasion of a PSFCH:
If a target resource at a time point n corresponds to an occasion of a PSFCH at a time point n-K8, a corresponding occasion in a codebook is determined by using at least a part of the following method:
An occasion of a PSFCH resource of FDM is traversed (that is, N_F is traversed); and
An occasion of a PSFCH is traversed based on a value of n-K8 (that is, K8 is traversed).
6. If the occasion is a subchannel or a subchannel to which a PSFCH occasion belongs:
If a target resource at a time point n corresponds to a subchannel at a time point n-K8 or a subchannel of a PSFCH at a time point n-K8, a corresponding occasion in a codebook is determined by using at least a part of the following method:
A subchannel of FDM is traversed (that is, N_S is traversed); and
Traversing is performed based on a value of n-K8 (that is, K8 is traversed).
It should be noted that, the traversing a subchannel in the foregoing manner may be traversing each subchannel or traversing each N subchannels.
It should be noted that, for each occasion corresponding to the codebook determined in the foregoing manner, if the occasion is not actually used for transmission, HARQ-ACK information corresponding to a HARQ-ACK codebook is set to a fixed state, for example, a NACK; and if the occasion is actually used for transmission, HARQ-ACK bit corresponding to the HARQ-ACK codebook=HARQ-ACK information corresponding to the occasion is set. It should be noted that one occasion may correspond to one or more HARQ-ACK bits in the codebook.
An example in which one or more resource pools exist but the target resource is only used to send sidelink information on one resource pool in the foregoing case 1 is still used:
1. An occasion of scheduling signaling used to schedule sidelink transmission:
For a target resource at a time point n, a corresponding occasion in a codebook is determined by using at least a part of the following method:

Each occasion that is actually used to transmit sidelink DCI and that is corresponding to the target resource is traversed; and
A carrier on which sidelink DCI/PDCCH is located is traversed (a carrier on which scheduling signaling is located is traversed).
2. If the occasion is an occasion of sidelink transmission:
For a target resource at a time point n, a corresponding occasion in a codebook is determined by using at least a part of the following method:
Each occasion that is actually used for sidelink transmission and that is corresponding to the target resource is traversed.
3. If the occasion is an occasion of SCI (PSCCH):
For a target resource at a time point n, a corresponding occasion in a codebook is determined by using at least a part of the following method:
Each occasion that is actually used to transmit SCI and that is corresponding to the target resource is traversed.
4. If the occasion is an occasion of a PSSCH:
For a target resource at a time point n, a corresponding occasion in a codebook is determined by using at least a part of the following method:
Each occasion that is actually used to transmit a PSSCH and that is corresponding to the target resource is traversed.
5. If the occasion is an occasion of a PSFCH:
For a target resource at a time point n, a corresponding occasion in a codebook is determined by using at least a part of the following method:
A PSFCH occasion corresponding to an occasion that is actually used for sidelink transmission and that is corresponding to the target resource is traversed; and
A PSFCH occasion that is actually used to transmit sidelink information and that is corresponding to the target resource is traversed.
Optionally, for multicast, if one PSSCH corresponds to M PSFCHs, these PSFCHs may be traversed, where M is an integer greater than or equal to 1.
6. If the occasion is a subchannel or a subchannel to which a PSFCH occasion belongs:
For a target resource at a time point n, a corresponding occasion in a codebook is determined by using at least a part of the following method:
If an occasion is a subchannel, a subchannel that is actually used for sidelink transmission in subchannels of FDM is traversed; and
If an occasion is a subchannel to which a PSFCH occasion belongs, a subchannel that is actually used to transmit sidelink information in the subchannels of FDM is traversed.
It should be noted that, for each occasion corresponding to the codebook determined in the foregoing manner, corresponding HARQ-ACK bit in a codebook=HARQ-ACK information corresponding to the occasion may be set.
An example in which one or more carriers exist but the target resource is only used to send sidelink feedback information on one sidelink carrier in the foregoing case 2 is used:
1. An occasion of scheduling signaling used to schedule sidelink transmission:
If a target resource at a time point n corresponds to an occasion of sidelink DCI at a time point n-K6, a corresponding occasion in a codebook is determined by using at least a part of the following method:
A carrier on which a sidelink DCI/PDCCH is located is traversed; and an occasion is traversed based on a value of n-K6 (that is, K6) is traversed.

2. If the occasion is an occasion of sidelink transmission:

If a target resource at a time point n corresponds to an occasion of sidelink transmission at a time point n-K7, a corresponding occasion in a codebook is determined by using at least a part of the following method:

A resource pool is traversed; and an occasion of SCI is traversed based on a value of n-K7 (that is, K7 is traversed).

It should be noted that in this embodiment of the present disclosure, the target resource corresponds to a plurality of resource pools on the carrier. If the target resource corresponds to only one resource pool, the resource pool may not need to be traversed.

3. If the occasion is an occasion of SCI (PSCCH):

If a target resource at a time point n corresponds to an occasion of SCI at a time point n-K7, a corresponding occasion in a codebook is determined by using at least a part of the following method:

A resource pool is traversed; and for each resource pool, an occasion of SCI is traversed based on a value of n-K7 (that is, K7 is traversed).

4. If the occasion is an occasion of a PSSCH:

If a target resource at a time point n corresponds to an occasion of a PSSCH at a time point n-K7, a corresponding occasion in a codebook is determined by using at least a part of the following method:

A resource pool is traversed; and for each resource pool, an occasion of a PSSCH is traversed based on a value of n-K7 (that is, K7 is traversed).

5. If the occasion is an occasion of a PSFCH:

If a target resource at a time point n corresponds to an occasion of a PSFCH at a time point n-K8, a corresponding occasion in a codebook is determined by using at least a part of the following method:

A resource pool is traversed;

for each resource pool, an occasion of a PSFCH resource of FDM is traversed (that is, N_F is traversed); and an occasion of a PSFCH is traversed based on a value of n-K8 (that is, K8 is traversed).

6. If the occasion is an occasion of a subchannel or a subchannel of a PSFCH:

If a target resource at a time point n corresponds to an occasion of a PSFCH at a time point n-K8, a corresponding occasion in a codebook is determined by using at least a part of the following method:

A resource pool is traversed;

an occasion of a subchannel of FDM is traversed (that is, N_S is traversed); and an occasion of a PSFCH is traversed based on a value of n-K8 (that is, K8 is traversed).

It should be noted that, for each occasion corresponding to the codebook determined in the foregoing manner, if the occasion is not actually used for transmission, HARQ-ACK information corresponding to a HARQ-ACK codebook is set to a fixed state, for example, a NACK; and if the occasion is actually used for transmission, HARQ-ACK bit corresponding to the HARQ-ACK codebook=HARQ-ACK information corresponding to the occasion is set.

An example in which one or more carriers exist but the target resource is only used to send sidelink feedback information on one sidelink carrier in the foregoing case 2 is still used:

1. An occasion of scheduling signaling used to schedule sidelink transmission:

For a target resource at a time point n, a corresponding occasion in a codebook is determined by using at least a part of the following method:

Each occasion that is actually used to transmit sidelink DCI and that is corresponding to the target resource is traversed; and a carrier on which sidelink DCI/PDCCH is located is traversed (a carrier on which scheduling signaling is located is traversed).

2. If the occasion is an occasion of sidelink transmission:

For a target resource at a time point n, a corresponding occasion in a codebook is determined by using at least a part of the following method:

Each occasion that is actually used for sidelink transmission and that is corresponding to the target resource is traversed; and for each occasion that is actually used for sidelink transmission, each resource pool is traversed.

3. If the occasion is an occasion of SCI (PSCCH):

For a target resource at a time point n, a corresponding occasion in a codebook is determined by using at least a part of the following method:

Each occasion that is actually used to transmit SCI and that is corresponding to the target resource is traversed; and for each occasion that is actually used to transmit SCI, each resource pool is traversed.

4. If the occasion is an occasion of a PSSCH:

For a target resource at a time point n, a corresponding occasion in a codebook is determined by using at least a part of the following method:

Each occasion that is actually used to transmit a PSSCH and that is corresponding to the target resource is traversed; and for each occasion that is actually used to transmit a PSSCH, each resource pool is traversed.

5. If the occasion is an occasion of a PSFCH:

For a target resource at a time point n, a corresponding occasion in a codebook is determined by using at least a part of the following method:

A PSFCH occasion corresponding to the target resource is traversed; and

For each occasion, each resource pool is traversed.

The traversing a PSFCH occasion may include:

traversing a PSFCH occasion corresponding to an occasion that is actually used for sidelink transmission; or traversing a PSFCH occasion that is actually used to transmit sidelink information.

It should be noted that, optionally, when one type of occasion is collected, only a dimension that includes the occasion type may be traversed. For example, if the occasion type is a PSFCH occasion, only a resource pool that includes the PSFCH occasion is traversed.

6. If the occasion is a subchannel or a subchannel to which a PSFCH occasion belongs:

For a target resource at a time point n, a corresponding occasion in a codebook is determined by using at least a part of the following method:

If an occasion is a subchannel, a subchannel that is actually used for sidelink transmission and that is corresponding to the target resource in subchannels of FDM is traversed;

if an occasion is a subchannel to which a PSFCH occasion belongs, a subchannel that is actually used to transmit sidelink information and that is corresponding to the target resource in the subchannels of FDM is traversed; and each resource pool is traversed.

It should be noted that, for each occasion corresponding to the codebook determined in the foregoing manner, corresponding HARQ-ACK bit in a HARQ-ACK codebook=HARQ-ACK information corresponding to the occasion may be set.

An example in which a plurality of carriers exist but the target resource is used to send sidelink feedback information on a plurality of sidelink carrier in the foregoing case 3 is used:

1. An occasion of scheduling signaling used to schedule sidelink transmission:

If a target resource at a time point n corresponds to an occasion of sidelink DCI at a time point n-K6, a corresponding occasion in a codebook is determined by using at least a part of the following method:

A carrier on which sidelink DCI/PDCCH is located is traversed (a carrier on which scheduling signaling is located is traversed); and for a carrier on which each sidelink DCI/PDCCH is located, an occasion is traversed based on a value of n-K6 (that is, K6 is traversed).

2. If the occasion is an occasion of sidelink transmission:

If a target resource at a time point n corresponds to an occasion of sidelink transmission at a time point n-K7, a corresponding occasion in a codebook is determined by using at least a part of the following method:

each sidelink carrier is traversed;

for each carrier, a resource pool is traversed; and for each resource pool, an occasion of SCI is traversed based on a value of n-K7 (that is, K7 is traversed).

3. If the occasion is an occasion of SCI (PSCCH):

If a target resource at a time point n corresponds to an occasion of SCI at a time point n-K7, a corresponding occasion in a codebook is determined by using at least a part of the following method:

each sidelink carrier is traversed;

for each carrier, a resource pool is traversed; and for each resource pool, an occasion of SCI is traversed based on a value of n-K7 (that is, K7 is traversed).

4. If the occasion is an occasion of a PSSCH:

If a target resource at a time point n corresponds to an occasion of a PSSCH at a time point n-K7, a corresponding occasion in a codebook is determined by using at least a part of the following method:

each sidelink carrier is traversed;

for each carrier, a resource pool is traversed; and for each resource pool, an occasion of a PSSCH is traversed based on a value of n-K7 (that is, K7 is traversed).

5. If the occasion is an occasion of a PSFCH:

If a target resource at a time point n corresponds to an occasion of a PSSCH at a time point n-K8, a corresponding occasion in a codebook is determined by using at least a part of the following method:

each sidelink carrier is traversed;

for each carrier, a resource pool is traversed;

for each resource pool, an occasion of a PSFCH resource of FDM is traversed (that is, N_F is traversed); and an occasion of a PSFCH is traversed based on a value of n-K8 (that is, K8 is traversed).

6. If the occasion is a subchannel or a subchannel to which a PSFCH occasion belongs:

If a target resource at a time point n corresponds to an occasion of a PSFCH at a time point n-K8, a corresponding occasion in a codebook is determined by using at least a part of the following method:

each sidelink carrier is traversed;

for each carrier, a resource pool is traversed;

an occasion of a subchannel of FDM is traversed (that is, N_S is traversed); and an occasion of a PSFCH is traversed based on a value of n-K8 (that is, K8 is traversed).

It should be noted that, for each occasion corresponding to the codebook determined in the foregoing manner, if the occasion is not actually used for transmission, HARQ-ACK information corresponding to a HARQ-ACK codebook is set to a fixed state, for example, a NACK; and if the occasion is actually used for transmission, HARQ-ACK bit corresponding to the HARQ-ACK codebook=HARQ-ACK information corresponding to the occasion is set.

An example in which a plurality of carriers exist but the target resource is used to send sidelink feedback information on a plurality of sidelink carrier in the foregoing case 3 is used:

1. An occasion of scheduling signaling used to schedule sidelink transmission:

For a target resource at a time point n, a corresponding occasion in a codebook is determined by using at least a part of the following method:

Each occasion that is actually used to transmit sidelink DCI and that is corresponding to the target resource is traversed; and a carrier on which sidelink DCI/PDCCH is located is traversed (a carrier on which scheduling signaling is located is traversed).

2. If the occasion is an occasion of sidelink transmission:

For a target resource at a time point n, a corresponding occasion in a codebook is determined by using at least a part of the following method:

Each occasion that is actually used for sidelink transmission and that is corresponding to the target resource is traversed;

for each occasion that is actually used for sidelink transmission and that is corresponding to the target resource, each resource pool is traversed; and each sidelink carrier is traversed.

3. If the occasion is an occasion of SCI (PSCCH):

For a target resource at a time point n, a corresponding occasion in a codebook is determined by using at least a part of the following method:

Each occasion that is actually used to transmit SCI and that is corresponding to the target resource is traversed;

for each occasion that is actually used to transmit SCI and that is corresponding to the target resource, each resource pool is traversed; and each sidelink carrier is traversed.

4. If the occasion is an occasion of a PSSCH:

For a target resource at a time point n, a corresponding occasion in a codebook is determined by using at least a part of the following method:

Each occasion that is actually used to transmit a PSSCH and that is corresponding to the target resource is traversed;

for each occasion that is actually used to transmit a PSSCH and that is corresponding to the target resource, each resource pool is traversed; and each sidelink carrier is traversed.

5. If the occasion is an occasion of a PSFCH:

For a target resource at a time point n, a corresponding occasion in a codebook is determined by using at least a part of the following method:

A PSFCH occasion is traversed;

for each occasion corresponding to the target resource, each resource pool is traversed; and each sidelink carrier is traversed;

The traversing a PSFCH occasion may include:

traversing a PSFCH occasion corresponding to an occasion that is actually used for sidelink transmission; or traversing a PSFCH occasion that is actually used to transmit sidelink information.

6. If the occasion is a subchannel or a subchannel to which a PSFCH occasion belongs:

For a target resource at a time point n, a corresponding occasion in a codebook is determined by using at least a part of the following method:

If an occasion is a subchannel, a subchannel that is actually used for sidelink transmission and that is corresponding to the target resource in subchannels of FDM is traversed;

if an occasion is a subchannel to which a PSFCH occasion belongs, a subchannel that is used to transmit sidelink information and that is actually corresponding to the target resource in the subchannels of FDM is traversed;

each resource pool is traversed; and each sidelink carrier is traversed.

It should be noted that, for each occasion corresponding to the codebook determined in the foregoing manner, corresponding HARQ-ACK bit in a HARQ-ACK codebook=HARQ-ACK information corresponding to the occasion may be set.

Optionally, in a case that the control node is a 5G base station or a base station of a later release, the control node may schedule an NR sidelink or an LTE sidelink. When determining a codebook, a position (for example, an occasion) of scheduling signaling of LTE sidelink transmission scheduled by the control node and/or a position (for example, an occasion) of LTE sidelink transmission scheduled by the control node may not be considered, that is, these positions are not considered, that is, it is not deemed that the positions (for example, the occasions) corresponding to the codebook, or the positions (for example, the occasions) may be skipped when the positions (for example, the occasions) are traversed. Alternatively, optionally, in another manner, when determining the codebook, these positions (for example, the occasions) are considered, but a fixed state is fed back for these positions (for example, the occasions), for example, all HARQ-ACK bits corresponding to these positions (for example, the occasions) indicate a NACK. Alternatively, in another manner, when determining the codebook, the position (for example, the occasion) of the scheduling signaling of the LTE sidelink transmission scheduled by the control node is considered. Such a position (for example, an occasion) corresponds to a separate codebook or sub-codebook. The control node may activate or deactivate a configured sidelink grant resource or a semi-persistent scheduling (SPS) resource on an LTE sidelink by using the scheduling signaling. Optionally, the codebook includes an acknowledgement of activation or deactivation signaling, for example, when receiving the activation or deactivation signaling and verifying that the signaling is valid, a corresponding HARQ-ACK bit indicates an ACK.

Optionally, a bit size of the codebook has at least one of the following conditions:

at least one position on a first resource corresponds to 1 bit in the codebook, and the first resource is a resource corresponding to a transmission manner in which one sidelink TB is carried in one sidelink transmission;

at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a plurality of resources including a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a third resource corresponds to a plurality of bits in the codebook, and the third resource is a resource corresponding to a transmission manner in which a CBG of one sidelink TB is carried in one sidelink transmission;

at least one position on a plurality of resources including a third resource corresponds to a plurality of bits in the codebook, and the third resource is a resource corresponding to a transmission manner in which a CBG of one sidelink TB is carried in one sidelink transmission;

at least one position on a fourth resource corresponds to a plurality of bits in the codebook, and the fourth resource is a resource corresponding to a transmission manner in which CBGs of a plurality of sidelink TBs are carried in one sidelink transmission; and at least one position on a plurality of resources including a fourth resource corresponds to a plurality of bits in the codebook, and the fourth resource is a resource corresponding to a transmission manner in which CBGs of a plurality of sidelink TBs are carried in one sidelink transmission.

The first resource, the second resource, the third resource, and the fourth resource may be a part or all of resources in a carrier, a BWP, or a resource pool.

The at least one position on the first resource, the second resource, the third resource, and the fourth resource may be all or a part of positions on the first resource, the second resource, the third resource, and the fourth resource.

In addition, the at least one position on the plurality of resources including the second resource and the at least one position on the second resource may be a same position, or may be different positions; the at least one position on the plurality of resources including the third resource and the at least one position on the third resource may be a same position, or may be different positions; and the at least one position on the plurality of resources including the fourth resource and the at least one position on the fourth resource may be a same position, or may be different positions. This is not limited herein.

In addition, that at least one position on a first resource corresponds to 1 bit in the codebook means that each of the at least one position on the first resource corresponds to 1 bit in the codebook. For the number of bits in at least one position on a remaining resource, for the corresponding descriptions of the first resource. Details are not described again.

That at least one position on a plurality of resources including a second resource correspond to 1 bit in the codebook may mean that the at least one position on the second resource corresponds to 1 bit in the codebook, and at least one position on a remaining resource also corresponds to 1 bit in the codebook; or may mean that the at least one position on the second resource corresponds to 1 bit in the codebook, and all positions on a remaining resource also correspond to 1 bit in the codebook.

That at least one position on a plurality of resources including a second resource correspond to a plurality of bits in the codebook may mean that the at least one position on the second resource corresponds to a plurality of bits in the codebook, and at least one position on a remaining resource also corresponds to a plurality of bits in the codebook; or may mean that the at least one position on the second resource corresponds to a plurality of bits in the codebook, and all positions on a remaining resource also correspond to a plurality of bits in the codebook. In addition, the numbers of bits are the same.

For example, in a resource pool, a position 1 on a first resource corresponds to 1 bit in the codebook, and a position 2 on a second resource in the resource pool corresponds to a plurality of bits in the codebook. In this case, a position 1 on a remaining resource corresponds to 1 bit in the codebook, and a position 2 on the remaining resource corresponds to a plurality of bits in the codebook, or all positions on the remaining resource correspond to a plurality of bits in the codebook.

It should be noted that for different resources, the foregoing plurality of bits may represent a plurality of different bits, that is, in a case that the codebook corresponds to a plurality of bits, positions on different resources may correspond to different numbers of bits in the codebook. Certainly, the plurality of bits are not the same. In addition, the foregoing condition may be implemented in a case that the feedback mechanism is a mechanism 1. For example, in a case of multicast, the mechanism 1 is used for feedback. Alternatively, the foregoing condition may be implemented in a case of unicast.

In addition, the resource described herein may be a carrier, a BWP, or a resource pool.

The following uses an example in which a transmission manner corresponding to an occasion is unicast for description:

1. If a transmission manner corresponding to a carrier/BWP/resource pool of a user is: one TB is transmitted on one PSSCH, the occasion on the carrier/BWP/resource pool corresponds to a 1-bit HARQ-ACK in the codebook.

2. If a transmission manner corresponding to a carrier/BWP/resource pool of a user is: two TBs are transmitted on one PSSCH:

If HARQ-ACK information corresponding to the two TBs is multiplexed, the occasion on the carrier/BWP/resource pool corresponds to a 1-bit HARQ-ACK in the codebook, or optionally, each of occasions on all carriers/all BWPs/all resource pools correspond to a 1-bit HARQ-ACK in the codebook.

If the HARQ-ACK information corresponding to the two TBs is not multiplexed, the occasion on the carrier/BWP/resource pool corresponds to a 2-bit HARQ-ACK in the codebook. Further, the HARQ-ACK information in this case corresponds to a separate sub-codebook or codebook (that is, not being multiplexed with another codebook, or being corresponding to a different target resource from another codebook). Alternatively, if the HARQ-ACK information corresponding to the two TBs is not multiplexed, each of occasions on all carriers/all BWPs/all resource pools corresponds to a 2-bit HARQ-ACK in the codebook.

3. If a transmission manner corresponding to a carrier/BWP/resource pool of a user is: a CBG is transmitted on one PSSCH:

If a CBG of one TB is transmitted, an occasion on the carrier/BWP/resource pool corresponds to a CBG_NUM_MAX-bit HARQ-ACK in the codebook, or optionally, each of occasions on all carriers/all BWPs/all resource pools correspond to a CBG_NUM_MAX-bit HARQ-ACK in the codebook.

If CBGs of two TBs are transmitted, the occasion on the carrier/BWP/resource pool corresponds to a 2*CBG_NUM_MAX-bit HARQ-ACK in the codebook, or each of occasions on all carriers/all BWPs/all resource pools corresponds to a 2*CBG_NUM_MAX-bit HARQ-ACK in the codebook.

The following uses an example in which a transmission manner corresponding to an occasion is multicast, there are M receiving terminals, and the mechanism 1 is used for description.

1. If a transmission manner corresponding to a carrier/BWP/resource pool of a user is: one TB is transmitted on one PSSCH, the occasion on the carrier/BWP/resource pool corresponds to a 1-bit HARQ-ACK in the codebook.

2. If a transmission manner corresponding to a carrier/BWP/resource pool of a user is: two TBs are transmitted on one PSSCH:

If HARQ-ACK information corresponding to the two TBs is multiplexed, the occasion on the carrier/BWP/resource pool corresponds to a 1-bit HARQ-ACK in the codebook, or each of occasions on all carriers/all BWPs/all resource pools correspond to a 1-bit HARQ-ACK in the codebook. For example, there are four carriers. For an occasion m, each carrier corresponds to 1 bit in the codebook on the occasion m.

If the HARQ-ACK information corresponding to the two TBs is not multiplexed, the occasion on the carrier/BWP/resource pool corresponds to a 2-bit HARQ-ACK in the codebook, or each of occasions on all carriers/all BWPs/all resource pools correspond to a 2-bit HARQ-ACK in the codebook. For example, there are four carriers. For an occasion m, each carrier corresponds to 2 bits in the codebook on the occasion m.

3. If a transmission manner corresponding to a carrier/BWP/resource pool of a user is: a CBG is transmitted on one PSSCH:

If a CBG of one TB is transmitted, an occasion on the carrier/BWP/resource pool corresponds to a CBG_

NUM_MAX-bit HARQ-ACK in the codebook, or each of occasions on all carriers/all BWPs/all resource pools correspond to a CBG_NUM_MAX-bit HARQ-ACK in the codebook. For example, there are four carriers. For an occasion m, each carrier corresponds to CBG_NUM_MAX bits in the codebook on the occasion m.

If CBGs of two TBs are transmitted, an occasion on the carrier/BWP/resource pool corresponds to a 2*CBG_NUM_MAX-bit HARQ-ACK in the codebook, or each of occasions on all carriers/all BWPs/all resource pools correspond to a 2*CBG_NUM_MAX-bit HARQ-ACK in the codebook. For example, there are four carriers. For an occasion m, each carrier corresponds to 2*CBG_NUM_MAX bits in the codebook on the occasion m.

Optionally, a bit size of the codebook has at least one of the following conditions:

at least one position on a fifth resource corresponds to M bits in the codebook, and the fifth resource is a resource corresponding to a transmission manner in which one sidelink TB is carried in one sidelink transmission;

at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a plurality of resources including a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a seventh resource corresponds to B*M bits in the codebook, and the seventh resource is a resource corresponding to a transmission manner in which a CBG of one sidelink TB is carried in one sidelink transmission;

at least one position on a plurality of resources including a seventh resource corresponds to B*M bits in the codebook, and the seventh resource is a resource corresponding to a transmission manner in which a CBG of one sidelink TB is carried in one sidelink transmission;

at least one position on an eighth resource corresponds to C*M bits in the codebook, and the eighth resource is a resource corresponding to a transmission manner in which CBGs of a plurality of sidelink TBs are carried in one sidelink transmission; and at least one position on a plurality of resources including an eighth resource corresponds to C*M bits in the codebook, and the eighth resource is a resource corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

It should be noted that for the fifth resource, the sixth resource, the seventh resource, and the eighth resource, refer to the corresponding descriptions of the first resource, the second resource, the third resource, and the fourth resource. Details are not described herein again.

The at least one position on the fifth resource, the sixth resource, the seventh resource, and the eighth resource may be all or a part of positions on the fifth resource, the sixth resource, the seventh resource, and the eighth resource.

In addition, the at least one position on the plurality of resources including the sixth resource and the at least one position on the sixth resource may be a same position, or may be different positions; the at least one position on the plurality of resources including the seventh resource and the at least one position on the seventh resource may be a same position, or may be different positions; and the at least one position on the plurality of resources including the eighth resource and the at least one position on the eighth resource may be a same position, or may be different positions. This is not limited herein.

It should be noted that * in this embodiment of the present disclosure represents multiplication.

In addition, the foregoing condition may be implemented in a case that the feedback mechanism is a mechanism 2. For example, in a multicast case, the mechanism 2 is used.

The following uses an example in which a transmission manner corresponding to an occasion is multicast, there are M receiving terminals, and the mechanism 2 is used for feedback for description.

1. If a transmission manner corresponding to a carrier/BWP/resource pool of a user is: one TB is transmitted on one PSSCH, the occasion on the carrier/BWP/resource pool corresponds to a 1*M-bit HARQ-ACK in the codebook.

2. If a transmission manner corresponding to a carrier/BWP/resource pool of a user is: two TBs are transmitted on one PSSCH:

If HARQ-ACK information corresponding to the two TBs is multiplexed, an occasion on the carrier/BWP/resource pool corresponds to a 1*M-bit HARQ-ACK in the codebook, or each of occasions on all carriers/all BWPs/all resource pools correspond to a 1*M-bit HARQ-ACK in the codebook. For example, there are four carriers. For an occasion m, each carrier corresponds to 1*M bits in the codebook on the occasion m.

If the HARQ-ACK information corresponding to the two TBs is not multiplexed, the occasion on the carrier/BWP/resource pool corresponds to a 2*M-bit HARQ-ACK in the codebook. Further, the HARQ-ACK information in this case corresponds to a separate sub-codebook or codebook.

Alternatively, if the HARQ-ACK information corresponding to the two TBs is not multiplexed, each of occasions on all resource pools/all BWPs/all resource pools correspond to a 2*M-bit HARQ-ACK in the codebook. For example, there are four carriers. For an occasion m, each carrier correspond to 2*M bits in the codebook on the occasion m.

3. If a transmission manner corresponding to a carrier/BWP/resource pool of a user is: a CBG is transmitted on one PSSCH:

If a CBG of one TB is transmitted, an occasion on the carrier/BWP/resource pool corresponds to a CBG_NUM_MAX*M-bit HARQ-ACK in the codebook, or each of occasions on all carriers/all BWPs/all resource pools correspond to a CBG_NUM_MAX*M-bit HARQ-ACK in the codebook. For example, there are four carriers. For an occasion m, each carrier corresponds to CBG_NUM_MAX*M bits in the codebook on the occasion m.

If CBGs of two TBs are transmitted, an occasion on the carrier/BWP/resource pool corresponds to a 2*CBG_NUM_MAX*M-bit HARQ-ACK in the codebook, or each of occasions on all carriers/all BWPs/all resource pools correspond to a 2*CBG_NUM_MAX*M-bit HARQ-ACK in the codebook. For example, there are four carriers. For an occasion m, each carrier corresponds to 2*CBG_NUM_MAX*M bits in the codebook on the occasion m.

Further, in this embodiment of the present disclosure, the multicast HARQ-ACK codebook may be a separate sub-codebook or codebook.

It should be noted that, the multicast HARQ-ACK codebook may be a separate sub-codebook or codebook.

In addition, all the carriers/all the BWPs are all carriers/all BWPs configured by the terminal, and all the resource pools are all resource pools that belongs to a same BWP/carrier/carrier group as the resource pool (that is, the resource pool described above, for example, if the resource is a resource pool, the resource pool may be a resource pool including the first resource to the eighth resource).

In addition, in this embodiment of the present disclosure, the terminal may perform an AND operation on HARQ-ACK information of a plurality of sidelink transmissions to obtain used as HARQ-ACK bits corresponding to these transmissions in the codebook. The plurality of sidelink transmissions may be sidelink transmissions in a same dimension, and the dimension may include at least one of a connection, a service, a HARQ process, a carrier, a bandwidth part BWP, a resource pool, a subchannel, a sidelink information feedback resource, a user, a transmission type, a resource scheduling type, a transmission manner, a latency, a ratio and a position. For example, an AND operation is performed on HARQ-ACK information of a plurality of sidelink transmissions in a same resource pool.

For example, the terminal may perform an AND operation on HARQ-ACK information of a plurality of sidelink transmissions (regardless of a scheduling type, a transmission type, a transmission manner, or the like) corresponding to a same target resource to obtain used as HARQ-ACK bits corresponding to these sidelink transmissions in the codebook. More specifically, the target resource corresponds to four sidelink transmissions. Two of the four transmissions are sidelink transmissions dynamically scheduled by using scheduling signaling, and the other two are sidelink transmissions on a configured sidelink grant. Each transmission has 1-bit HARQ-ACK information, and an indicated state is a NACK, a NACK, an ACK, and an ACK (assuming that 0 represents a NACK and 1 represents an ACK, corresponding values are 0, 0, 1, and 1, respectively). The user performs an AND operation on these bits to obtain 1-bit 0, that is, a NACK, so that 1 bit in the codebook corresponds to the four transmissions. In addition, the bit indicates a NACK. For another example, the target resource corresponds to the four sidelink transmissions. Two of the four transmissions are unicast, and the other two are multicast. Each transmission has 1-bit HARQ-ACK information, and an indicated state is a NACK, a NACK, an ACK, and an ACK (assuming that 0 represents a NACK and 1 represents an ACK, corresponding values are 0, 0, 1, 1, and 1). The user performs an AND operation on these bits to obtain 1-bit 0, that is, a NACK, so that 1 bit in the codebook corresponds to the four transmissions, and the bit indicates a NACK.

The terminal may perform an AND operation on HARQ-ACK information fed back by different terminals to obtain used as HARQ-ACK bits corresponding to these transmissions in the codebook. For example, for multicast, the terminal may perform an AND operation on HARQ-ACK information fed back by all RX UEs to obtain used as HARQ-ACK bits corresponding to the multicast transmission in the codebook. For example, a TX UE sends a multicast transmission, there are four RX UEs, and HARQ-ACK information that is fed back is a NACK, a NACK, an ACK, and an ACK (assuming that 0 represents a NACK and 1 represents an ACK, corresponding values are 0, 0, 1, and 1). The TX UE performs an AND operation on these bits to obtain 1-bit 0, that is, a NACK, so that 1 bit in the codebook corresponds to the multicast transmission, and the bit indicates a NACK.

For at least two transmissions corresponding to a same target resource, the terminal may perform an AND operation on a corresponding HARQ-ACK to obtain HARQ-ACK bits corresponding to these transmissions in the codebook.

The foregoing at least two transmissions may be transmission and dynamic scheduling on the configured sidelink grant. Alternatively, the foregoing at least two transmissions may be multicast transmission and unicast transmission.

In addition, optionally, in a case that the feedback mechanism 1 is used, when sidelink information of an occasion corresponding to a target resource indicates a NACK or discontinuous transmission (DTX), HARQ-ACK bits corresponding to the occasion in the corresponding codebook does not necessarily indicate a NACK or DTX, and the TX UE may determine content fed back by the TX UE.

One occasion may correspond to one or more HARQ-ACK bits in the codebook.

In this embodiment of the present disclosure, a codebook corresponding to sidelink information is obtained based on codebook information; and the codebook is sent. The codebook corresponding to the sidelink information is sent, so that understanding of sidelink information is consistent between different sides, and a control node can normally schedule terminal transmission, to meet a requirement such as a latency of sidelink transmission, and further improve resource utilization.

Figure 5:
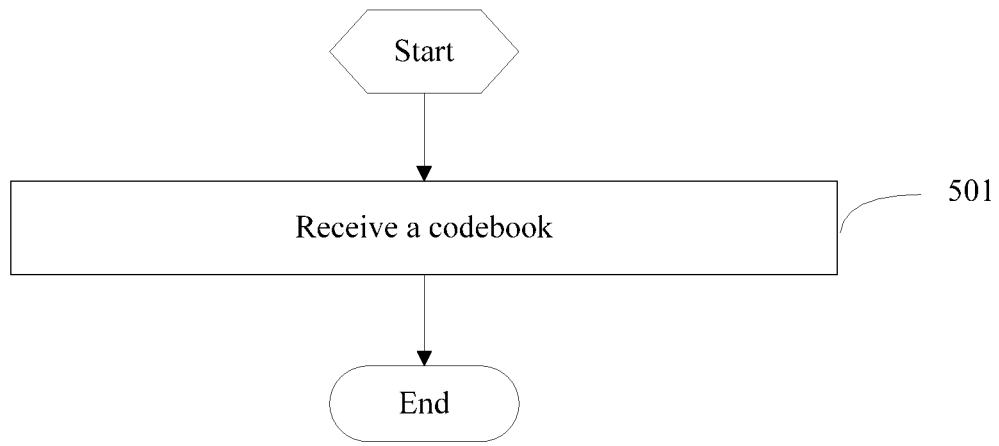
FIG. 5 is a flowchart of a sidelink information receiving method according to an embodiment of the present disclosure.

Referring to FIG. 5, FIG. 5 is a flowchart of a sidelink information receiving method according to an embodiment of the present disclosure. The method is applied to a control node. As shown in FIG. 5, the method includes the following steps:

Step 501: Receive a codebook, where the codebook is a codebook corresponding to sidelink information.

It should be noted that the codebook may be separately transmitted on one resource, or the codebook and other information are multiplexed on one resource for transmission. Therefore, the codebook may be received in a case that the codebook is separately transmitted on a resource, or the codebook may be received in a case that the codebook and other information are multiplexed on one resource for transmission.

Optionally, the control node is configured to configure codebook information of the codebook, and the codebook information includes at least one of the following information:

a type of a position corresponding to the codebook;
the position corresponding to the codebook;
a structure of the codebook;

traversal information of the position corresponding to the codebook; and
a size of the codebook, where
the position includes at least one of an occasion and a frequency domain position.

Optionally, the type of the position corresponding to the codebook includes at least one of the following:
a position of scheduling signaling used to schedule sidelink transmission;
a position of the sidelink transmission;
a position of the sidelink information; and
a subchannel.

Optionally, the position of the sidelink transmission includes at least one of the following:
a position of sidelink control information SCI in the sidelink transmission and a position of sidelink data in the sidelink transmission; and/or
the subchannel includes at least one of the following:
a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Optionally, the position corresponding to the codebook is determined based on a correspondence, and the correspondence includes a correspondence between the codebook and at least one of the following:
a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

Optionally, the connection includes at least one of a connection type, a connection number, and a connection identifier; and/or
the service information includes at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
the HARQ process information includes at least one of a sidelink HARQ process number, a sidelink HARQ process identifier, a new radio Uu HARQ process, and a Uu HARQ process identifier; and/or
the carrier information includes at least one of the number of sidelink carriers, an identifier of a sidelink carrier, the number of Uu carriers, and an identifier of a Uu carrier; and/or
the BWP information includes at least one of the number of sidelink BWPs, an identifier of a sidelink BWP, the number of Uu BWPs, and an identifier of a Uu BWP; and/or
the resource pool information includes at least one of the number of resource pools, a type of a resource pool, and an identifier of the resource pool; and/or
the subchannel information includes at least one of a subchannel offset, a reference subchannel, a target subchannel, and a subchannel number; and/or
the sidelink information feedback resource information includes a sidelink information feedback resource configuration parameter; and/or
the user information includes a user identifier; and/or
the transmission type information includes at least one of a transmission type, a transmission identifier, the number of members in one group during multicast, a maximum number of members in one group during multicast, and a multicast feedback mechanism; and/or
the resource scheduling type information includes at least one of static scheduling, dynamic scheduling, and semi-static scheduling; and/or
the transmission manner information includes at least one of: the number of sidelink transport blocks TBs carried in one sidelink transmission, whether sidelink information corresponding to a plurality of sidelink TBs carried in one sidelink transmission is multiplexed, and configuration of a code block group CBG in one sidelink transmission; and/or
the ratio includes a ratio of a target resource to a position, where the target resource is a resource for sending the codebook; and/or
the position information includes an identifier of the position corresponding to the target resource for sending the codebook; and/or
the resource information includes an identifier of the target resource for sending the codebook, and the identifier of the target resource corresponds to a position; and/or
the latency information includes at least one of the following:
a latency between a position of scheduling signaling and a position of sidelink transmission scheduled by using the scheduling signaling;
a latency between a position of scheduling signaling and a position of a sidelink information feedback resource corresponding to a position of sidelink transmission scheduled by using the scheduling signaling;
a latency between a position of scheduling signaling and a target resource corresponding to sidelink transmission scheduled by using the scheduling signaling, where the target resource is a resource for sending the codebook;
a latency between a position of sidelink transmission and a corresponding target resource, where the target resource is a resource for sending the codebook;
a latency between a sidelink information feedback resource and a corresponding target resource, where the target resource is a resource for sending the codebook; and
a latency between a position of sidelink transmission and a corresponding sidelink information feedback resource.

Optionally, the structure of the codebook is one codebook, or the structure of the codebook includes at least two sub-codebooks.

Optionally, the structure of the codebook has at least one of the following features:
different transmission manners correspond to different codebooks or sub-codebooks;
different resource scheduling types correspond to different codebooks or sub-codebooks;
different transmission types correspond to different codebooks or sub-codebooks;
different feedback mechanisms correspond to different codebooks or sub-codebooks;
different users correspond to different codebooks or sub-codebooks;
different resource pools correspond to different codebooks or sub-codebooks;

different carriers correspond to different codebooks or sub-codebooks;
different BWPs correspond to different codebooks or sub-codebooks;
different subchannels correspond to different codebooks or sub-codebooks;
different latencies correspond to different codebooks or sub-codebooks;
different sidelink information feedback resource configurations correspond to different codebooks or sub-codebooks;
different ratios correspond to different codebooks or sub-codebooks;
different HARQ processes correspond to different codebooks or sub-codebooks;
different services correspond to different codebooks or sub-codebooks;
different sidelink information sizes correspond to different codebooks or sub-codebooks; and
different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs respectively correspond to different codebooks or sub-codebooks.

Optionally, the traversal information of the position corresponding to the codebook is used to determine a sequence correspondence between a bit in the codebook and a position.

Optionally, the traversal information of the position corresponding to the codebook includes a dimension of a traversed position, and the dimension includes at least one of the following:
    a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain FDM number, and a feedback mechanism.

Optionally, a bit size of the codebook has at least one of the following conditions:
    at least one position on a first resource corresponds to 1 bit in the codebook, and the first resource is a resource corresponding to a transmission manner in which one sidelink TB is carried in one sidelink transmission;
    at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
    at least one position on a plurality of resources including a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
    at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
    at least one position on a plurality of resources including a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
    at least one position on a third resource corresponds to a plurality of bits in the codebook, and the third resource is a resource corresponding to a transmission manner in which a CBG of one sidelink TB is carried in one sidelink transmission;
    at least one position on a plurality of resources including a third resource corresponds to a plurality of bits in the codebook, and the third resource is a resource corresponding to a transmission manner in which a CBG of one sidelink TB is carried in one sidelink transmission;
    at least one position on a fourth resource corresponds to a plurality of bits in the codebook, and the fourth resource is a resource corresponding to a transmission manner in which CBGs of a plurality of sidelink TBs are carried in one sidelink transmission; and
    at least one position on a plurality of resources including a fourth resource corresponds to a plurality of bits in the codebook, and the fourth resource is a resource corresponding to a transmission manner in which CBGs of a plurality of sidelink TBs are carried in one sidelink transmission.

Optionally, a bit size of the codebook has at least one of the following conditions:
    at least one position on a fifth resource corresponds to M bits in the codebook, and the fifth resource is a resource corresponding to a transmission manner in which one sidelink TB is carried in one sidelink transmission;
    at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
    at least one position on a plurality of resources including a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
    at least one position on a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;
    at least one position on a plurality of resources including a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;
    at least one position on a seventh resource corresponds to B*M bits in the codebook, and the seventh resource is a resource corresponding to a transmission manner in which a CBG of one sidelink TB is carried in one sidelink transmission;

at least one position on a plurality of resources including a seventh resource corresponds to B*M bits in the codebook, and the seventh resource is a resource corresponding to a transmission manner in which a CBG of one sidelink TB is carried in one sidelink transmission;

at least one position on an eighth resource corresponds to C*M bits in the codebook, and the eighth resource is a resource corresponding to a transmission manner in which CBGs of a plurality of sidelink TBs are carried in one sidelink transmission; and at least one position on a plurality of resources including an eighth resource corresponds to C*M bits in the codebook, and the eighth resource is a resource corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

Optionally, the sidelink information includes:
sidelink information fed back by a receiving user; or
sidelink information determined based on a receiving status of receiving sidelink transmission.

Optionally, the sidelink information includes at least one of the following:
a sidelink HARQ-ACK, a sidelink SR, and sidelink channel state information CSI.

Optionally, different codebooks are received on different target resources.

It should be noted that this embodiment is used as an implementation of the control node side corresponding to the embodiment shown in FIG. 2. For a specific implementation, refer to the related descriptions of the embodiment shown in FIG. 2. To avoid repeated descriptions, details are not described again in this embodiment. In this embodiment, resource utilization can be improved.

Figure 6:
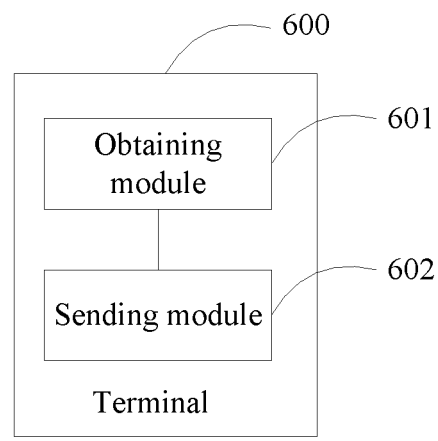
FIG. 6 is a structural diagram of a terminal according to an embodiment of the present disclosure.

Referring to FIG. 6, FIG. 6 is a structural diagram of a terminal according to an embodiment of the present disclosure. As shown in FIG. 6, a terminal 600 includes:
an obtaining module 601, configured to obtain a codebook corresponding to sidelink information based on codebook information; and
a sending module 602, configured to send the codebook.

Optionally, the codebook information includes at least one of the following information:
a type of a position corresponding to the codebook;
the position corresponding to the codebook;
a structure of the codebook;
traversal information of the position corresponding to the codebook; and
a size of the codebook, where
the position includes at least one of an occasion and a frequency domain position.

Optionally, the type of the position corresponding to the codebook includes at least one of the following:
a position of scheduling signaling used to schedule sidelink transmission;
a position of the sidelink transmission;
a position of the sidelink information; and
a subchannel.

Optionally, the position of the sidelink transmission includes at least one of the following:
a position of sidelink control information SCI in the sidelink transmission and a position of sidelink data in the sidelink transmission; and/or
the subchannel includes at least one of the following:
a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Optionally, the position corresponding to the codebook is determined based on a correspondence, and the correspondence includes a correspondence between the codebook and at least one of the following:
a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

Optionally, the connection includes at least one of a connection type, a connection number, and a connection identifier; and/or
the service information includes at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
the HARQ process information includes at least one of a sidelink HARQ process number, a sidelink HARQ process identifier, a new radio Uu HARQ process, and a Uu HARQ process identifier; and/or
the carrier information includes at least one of the number of sidelink carriers, an identifier of a sidelink carrier, the number of Uu carriers, and an identifier of a Uu carrier; and/or
the BWP information includes at least one of the number of sidelink BWPs, an identifier of a sidelink BWP, the number of Uu BWPs, and an identifier of a Uu BWP; and/or
the resource pool information includes at least one of the number of resource pools, a type of a resource pool, and an identifier of the resource pool; and/or
the subchannel information includes at least one of a subchannel offset, a reference subchannel, a target subchannel, and a subchannel number; and/or
the sidelink information feedback resource information includes a sidelink information feedback resource configuration parameter; and/or
the user information includes a user identifier; and/or
the transmission type information includes at least one of a transmission type, a transmission identifier, the number of members in one group during multicast, a maximum number of members in one group during multicast, and a multicast feedback mechanism; and/or
the resource scheduling type information includes at least one of static scheduling, dynamic scheduling, and semi-static scheduling; and/or
the transmission manner information includes at least one of: the number of sidelink transport blocks TBs carried in one sidelink transmission, whether sidelink information corresponding to a plurality of sidelink TBs carried in one sidelink transmission is multiplexed, and configuration of a code block group CBG in one sidelink transmission; and/or the ratio includes a ratio of a target resource to a position, where the target resource is a resource for sending the codebook; and/or the position information includes an identifier of the position corresponding to the target resource for sending the codebook; and/or the resource information includes an identifier of the target resource for sending the codebook, and the identifier of the target resource corresponds to a position; and/or the latency information includes at least one of the following:

a latency between a position of scheduling signaling and a position of sidelink transmission scheduled by using the scheduling signaling;

a latency between a position of scheduling signaling and a position of a sidelink information feedback resource corresponding to a position of sidelink transmission scheduled by using the scheduling signaling;

a latency between a position of scheduling signaling and a target resource corresponding to sidelink transmission scheduled by using the scheduling signaling, where the target resource is a resource for sending the codebook;

a latency between a position of sidelink transmission and a corresponding target resource, where the target resource is a resource for sending the codebook;

a latency between a sidelink information feedback resource and a corresponding target resource, where the target resource is a resource for sending the codebook; and a latency between a position of sidelink transmission and a corresponding sidelink information feedback resource.

Optionally, the structure of the codebook is one codebook, or the structure of the codebook includes at least two sub-codebooks.

Optionally, the structure of the codebook has at least one of the following features:

different transmission manners correspond to different codebooks or sub-codebooks;

different resource scheduling types correspond to different codebooks or sub-codebooks;

different transmission types correspond to different codebooks or sub-codebooks;

different feedback mechanisms correspond to different codebooks or sub-codebooks;

different users correspond to different codebooks or sub-codebooks;

different resource pools correspond to different codebooks or sub-codebooks;

different carriers correspond to different codebooks or sub-codebooks;

different BWPs correspond to different codebooks or sub-codebooks;

different subchannels correspond to different codebooks or sub-codebooks;

different latencies correspond to different codebooks or sub-codebooks;

different sidelink information feedback resource configurations correspond to different codebooks or sub-codebooks;

different ratios correspond to different codebooks or sub-codebooks;

different HARQ processes correspond to different codebooks or sub-codebooks;

different services correspond to different codebooks or sub-codebooks;

different sidelink information sizes correspond to different codebooks or sub-codebooks; and different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs respectively correspond to different codebooks or sub-codebooks.

Optionally, the traversal information of the position corresponding to the codebook is used to determine a sequence correspondence between a bit in the codebook and a position.

Optionally, the traversal information of the position corresponding to the codebook includes a dimension of a traversed position, and the dimension includes at least one of the following:

a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain frequency division multiplexing FDM number, and a feedback mechanism.

Optionally, a bit size of the codebook has at least one of the following conditions:

at least one position on a first resource corresponds to 1 bit in the codebook, and the first resource is a resource corresponding to a transmission manner in which one sidelink TB is carried in one sidelink transmission;

at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a plurality of resources including a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a third resource corresponds to a plurality of bits in the codebook, and the third resource is a resource corresponding to a transmission manner in which a CBG of one sidelink TB is carried in one sidelink transmission;

at least one position on a plurality of resources including a third resource corresponds to a plurality of bits in the codebook, and the third resource is a resource corresponding to a transmission manner in which a CBG of one sidelink TB is carried in one sidelink transmission;

at least one position on a fourth resource corresponds to a plurality of bits in the codebook, and the fourth resource is a resource corresponding to a transmission manner in which CBGs of a plurality of sidelink TBs are carried in one sidelink transmission; and at least one position on a plurality of resources including a fourth resource corresponds to a plurality of bits in the codebook, and the fourth resource is a resource corresponding to a transmission manner in which CBGs of a plurality of sidelink TBs are carried in one sidelink transmission.

Optionally, a bit size of the codebook has at least one of the following conditions:

at least one position on a fifth resource corresponds to M bits in the codebook, and the fifth resource is a resource corresponding to a transmission manner in which one sidelink TB is carried in one sidelink transmission;

at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a plurality of resources including a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a seventh resource corresponds to B*M bits in the codebook, and the seventh resource is a resource corresponding to a transmission manner in which a CBG of one sidelink TB is carried in one sidelink transmission;

at least one position on a plurality of resources including a seventh resource corresponds to B*M bits in the codebook, and the seventh resource is a resource corresponding to a transmission manner in which a CBG of one sidelink TB is carried in one sidelink transmission;

at least one position on an eighth resource corresponds to C*M bits in the codebook, and the eighth resource is a resource corresponding to a transmission manner in which CBGs of a plurality of sidelink TBs are carried in one sidelink transmission; and at least one position on a plurality of resources including an eighth resource corresponds to C*M bits in the codebook, and the eighth resource is a resource corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

Optionally, the sidelink information includes:

sidelink information fed back by a receiving user; or sidelink information determined based on a receiving status of receiving sidelink transmission.

Optionally, the sidelink information includes at least one of the following:

a sidelink hybrid automatic repeat request acknowledgement HARQ-ACK, a sidelink scheduling request SR, and sidelink channel state information CSI.

Optionally, the codebook information is determined in at least one of the following manners:

being configured by a control node, being predefined by a protocol, being indicated by another terminal, being negotiated between terminals, and being preconfigured.

Optionally, different codebooks are sent on different target resources.

The terminal provided in this embodiment of the present disclosure can implement the processes implemented by the terminal in the method embodiment in FIG. 2. To avoid repetition, details are not described herein again. In this way, resource utilization can be improved.

Figure 7:
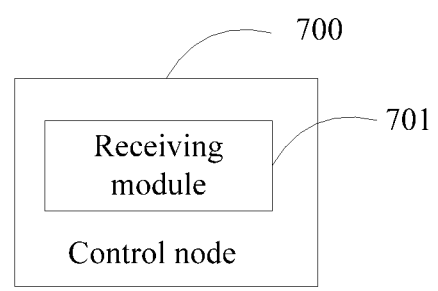
FIG. 7 is a structural diagram of a control node according to an embodiment of the present disclosure.

Referring to FIG. 7, FIG. 7 is a structural diagram of a control node according to an embodiment of the present disclosure. As shown in FIG. 7, a control node 700 includes:

a receiving module 701, configured to receive a codebook, where the codebook is a codebook corresponding to sidelink information.

Optionally, the control node is configured to configure codebook information of the codebook, and the codebook information includes at least one of the following information:

a type of a position corresponding to the codebook;

the position corresponding to the codebook;

a structure of the codebook;

traversal information of the position corresponding to the codebook; and a size of the codebook, where the position includes at least one of an occasion and a frequency domain position.

Optionally, the type of the position corresponding to the codebook includes at least one of the following:

a position of scheduling signaling used to schedule sidelink transmission;

a position of the sidelink transmission;

a position of the sidelink information; and a subchannel.

Optionally, the position of the sidelink transmission includes at least one of the following:

a position of sidelink control information SCI in the sidelink transmission and a position of sidelink data in the sidelink transmission; and/or the subchannel includes at least one of the following:

a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Optionally, the position corresponding to the codebook is determined based on a correspondence, and the correspondence includes a correspondence between the codebook and at least one of the following:
  a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

Optionally, the connection includes at least one of a connection type, a connection number, and a connection identifier; and/or
  the service information includes at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
  the HARQ process information includes at least one of a sidelink HARQ process number, a sidelink HARQ process identifier, a new radio Uu HARQ process, and a Uu HARQ process identifier; and/or
  the carrier information includes at least one of the number of sidelink carriers, an identifier of a sidelink carrier, the number of Uu carriers, and an identifier of a Uu carrier; and/or
  the BWP information includes at least one of the number of sidelink BWPs, an identifier of a sidelink BWP, the number of Uu BWPs, and an identifier of a Uu BWP; and/or
  the resource pool information includes at least one of the number of resource pools, a type of a resource pool, and an identifier of the resource pool; and/or
  the subchannel information includes at least one of a subchannel offset, a reference subchannel, a target subchannel, and a subchannel number; and/or
  the sidelink information feedback resource information includes a sidelink information feedback resource configuration parameter; and/or
  the user information includes a user identifier; and/or
  the transmission type information includes at least one of a transmission type, a transmission identifier, the number of members in one group during multicast, a maximum number of members in one group during multicast, and a multicast feedback mechanism; and/or
  the resource scheduling type information includes at least one of static scheduling, dynamic scheduling, and semi-static scheduling; and/or
  the transmission manner information includes at least one of: the number of sidelink transport blocks TBs carried in one sidelink transmission, whether sidelink information corresponding to a plurality of sidelink TBs carried in one sidelink transmission is multiplexed, and configuration of a code block group CBG in one sidelink transmission; and/or
  the ratio includes a ratio of a target resource to a position, where the target resource is a resource for sending the codebook; and/or
  the position information includes an identifier of the position corresponding to the target resource for sending the codebook; and/or
  the resource information includes an identifier of the target resource for sending the codebook, and the identifier of the target resource corresponds to a position; and/or
  the latency information includes at least one of the following:
  a latency between a position of scheduling signaling and a position of sidelink transmission scheduled by using the scheduling signaling;
  a latency between a position of scheduling signaling and a position of a sidelink information feedback resource corresponding to a position of sidelink transmission scheduled by using the scheduling signaling;
  a latency between a position of scheduling signaling and a target resource corresponding to sidelink transmission scheduled by using the scheduling signaling, where the target resource is a resource for sending the codebook;
  a latency between a position of sidelink transmission and a corresponding target resource, where the target resource is a resource for sending the codebook;
  a latency between a sidelink information feedback resource and a corresponding target resource, where the target resource is a resource for sending the codebook; and
  a latency between a position of sidelink transmission and a corresponding sidelink information feedback resource.

Optionally, the structure of the codebook is one codebook, or the structure of the codebook includes at least two sub-codebooks.

Optionally, the structure of the codebook has at least one of the following features:
  different transmission manners correspond to different codebooks or sub-codebooks;
  different resource scheduling types correspond to different codebooks or sub-codebooks;
  different transmission types correspond to different codebooks or sub-codebooks;
  different feedback mechanisms correspond to different codebooks or sub-codebooks;
  different users correspond to different codebooks or sub-codebooks;
  different resource pools correspond to different codebooks or sub-codebooks;
  different carriers correspond to different codebooks or sub-codebooks;
  different BWPs correspond to different codebooks or sub-codebooks;
  different subchannels correspond to different codebooks or sub-codebooks;
  different latencies correspond to different codebooks or sub-codebooks;
  different sidelink information feedback resource configurations correspond to different codebooks or sub-codebooks;
  different ratios correspond to different codebooks or sub-codebooks;
  different HARQ processes correspond to different codebooks or sub-codebooks;
  different services correspond to different codebooks or sub-codebooks;
  different sidelink information sizes correspond to different codebooks or sub-codebooks; and different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs respectively correspond to different codebooks or sub-codebooks.

Optionally, the traversal information of the position corresponding to the codebook is used to determine a sequence correspondence between a bit in the codebook and a position.

Optionally, the traversal information of the position corresponding to the codebook includes a dimension of a traversed position, and the dimension includes at least one of the following:
- a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain FDM number, and a feedback mechanism.

Optionally, a bit size of the codebook has at least one of the following conditions:
- at least one position on a first resource corresponds to 1 bit in the codebook, and the first resource is a resource corresponding to a transmission manner in which one sidelink TB is carried in one sidelink transmission;
- at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
- at least one position on a plurality of resources including a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
- at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
- at least one position on a plurality of resources including a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
- at least one position on a third resource corresponds to a plurality of bits in the codebook, and the third resource is a resource corresponding to a transmission manner in which a CBG of one sidelink TB is carried in one sidelink transmission;
- at least one position on a plurality of resources including a third resource corresponds to a plurality of bits in the codebook, and the third resource is a resource corresponding to a transmission manner in which a CBG of one sidelink TB is carried in one sidelink transmission;
- at least one position on a fourth resource corresponds to a plurality of bits in the codebook, and the fourth resource is a resource corresponding to a transmission manner in which CBGs of a plurality of sidelink TBs are carried in one sidelink transmission; and
- at least one position on a plurality of resources including a fourth resource corresponds to a plurality of bits in the codebook, and the fourth resource is a resource corresponding to a transmission manner in which CBGs of a plurality of sidelink TBs are carried in one sidelink transmission.

Optionally, a bit size of the codebook has at least one of the following conditions:
- at least one position on a fifth resource corresponds to M bits in the codebook, and the fifth resource is a resource corresponding to a transmission manner in which one sidelink TB is carried in one sidelink transmission;
- at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
- at least one position on a plurality of resources including a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
- at least one position on a sixth resource correspond to $A*M$ bits in the codebook, the sixth resource is a resource corresponding to a transmission manner in which a plurality of sidelink TBs are carried in one sidelink transmission, and sidelink information corresponding to the plurality of sidelink TBs is not multiplexed;
- at least one position on a plurality of resources including a sixth resource correspond to $A*M$ bits in the codebook, the sixth resource is a resource corresponding to a transmission manner in which a plurality of sidelink TBs are carried in one sidelink transmission, and sidelink information corresponding to the plurality of sidelink TBs is not multiplexed;
- at least one position on a seventh resource corresponds to $B*M$ bits in the codebook, and the seventh resource is a resource corresponding to a transmission manner in which a CBG of one sidelink TB is carried in one sidelink transmission;
- at least one position on a plurality of resources including a seventh resource corresponds to $B*M$ bits in the codebook, and the seventh resource is a resource corresponding to a transmission manner in which a CBG of one sidelink TB is carried in one sidelink transmission;
- at least one position on an eighth resource corresponds to $C*M$ bits in the codebook, and the eighth resource is a resource corresponding to a transmission manner in which CBGs of a plurality of sidelink TBs are carried in one sidelink transmission; and
- at least one position on a plurality of resources including an eighth resource corresponds to $C*M$ bits in the codebook, and the eighth resource is a resource corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

Optionally, the sidelink information includes:
sidelink information fed back by a receiving user; or
sidelink information determined based on a receiving status of receiving sidelink transmission.

Optionally, the sidelink information includes at least one of the following:
a sidelink HARQ-ACK, a sidelink SR, and sidelink channel state information CSI.

Optionally, different codebooks are received on different target resources.

The control node provided in this embodiment of the present disclosure can implement the processes implemented by the control node in the method embodiment in FIG. 5. To avoid repetition, details are not described herein again. In this way, resource utilization can be improved.

Figure 8:
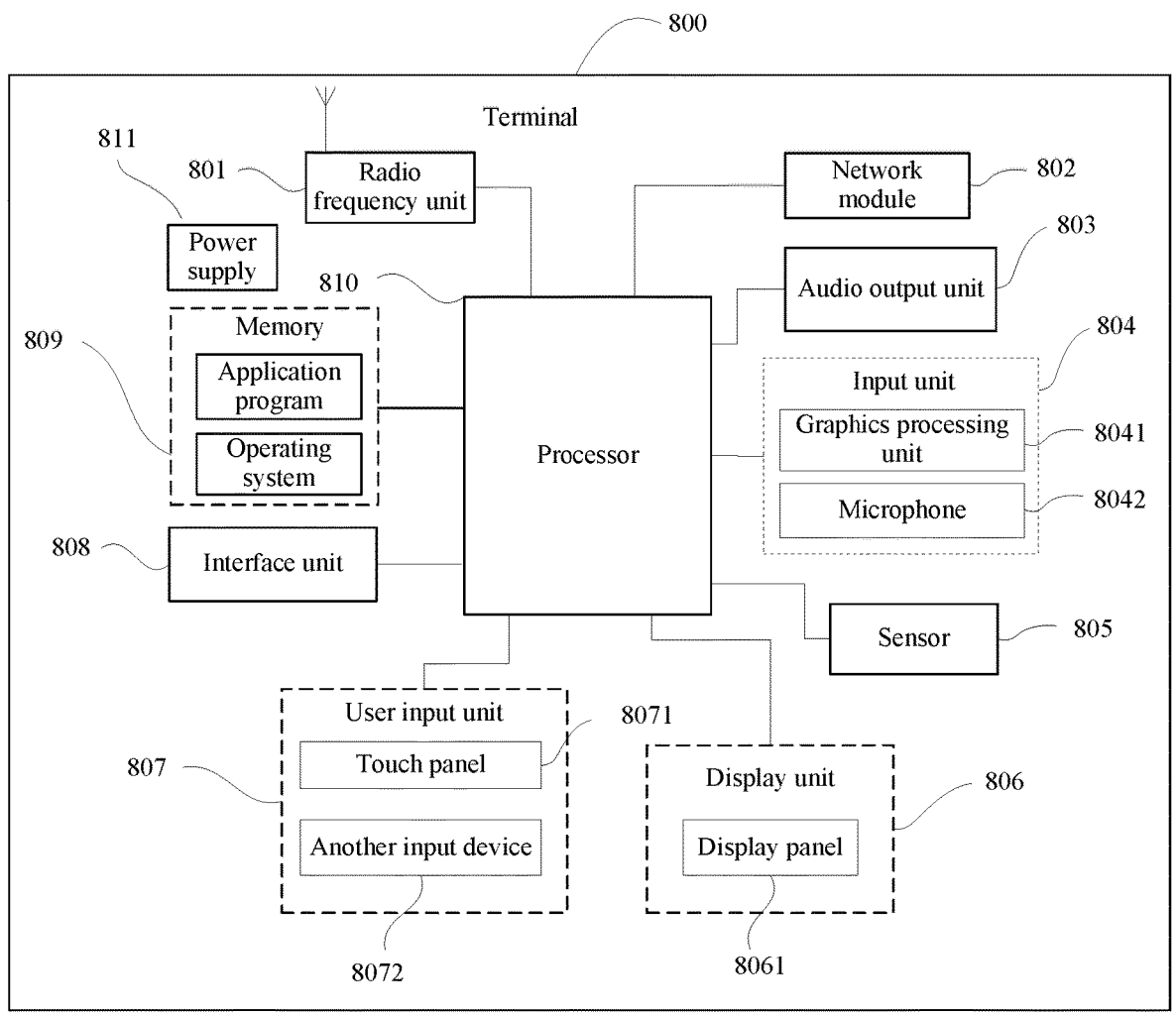
FIG. 8 is a structural diagram of another terminal according to an embodiment of the present disclosure.

FIG. 8 is a schematic diagram of a hardware structure of a terminal according to the embodiments of the present disclosure.

A terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. It can be understood by persons skilled in the art that, the terminal structure shown in FIG. 8 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a robot, a wearable device, a pedometer, and the like.

The processor 810 is configured to obtain a codebook corresponding to sidelink information based on codebook information; and
the radio frequency unit 801 is configured to send the codebook.

Optionally, the codebook information includes at least one of the following information:
a type of a position corresponding to the codebook;
the position corresponding to the codebook;
a structure of the codebook;
traversal information of the position corresponding to the codebook; and
a size of the codebook, where
the position includes at least one of an occasion and a frequency domain position.

Optionally, the type of the position corresponding to the codebook includes at least one of the following:
a position of scheduling signaling used to schedule sidelink transmission;
a position of the sidelink transmission;
a position of the sidelink information; and
a subchannel.

Optionally, the position of the sidelink transmission includes at least one of the following:
a position of sidelink control information SCI in the sidelink transmission and a position of sidelink data in the sidelink transmission; and/or
the subchannel includes at least one of the following:
a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Optionally, the position corresponding to the codebook is determined based on a correspondence, and the correspondence includes a correspondence between the codebook and at least one of the following:
a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

Optionally, the connection includes at least one of a connection type, a connection number, and a connection identifier; and/or
the service information includes at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
the HARQ process information includes at least one of a sidelink HARQ process number, a sidelink HARQ process identifier, a new radio Uu HARQ process, and a Uu HARQ process identifier; and/or
the carrier information includes at least one of the number of sidelink carriers, an identifier of a sidelink carrier, the number of Uu carriers, and an identifier of a Uu carrier; and/or
the BWP information includes at least one of the number of sidelink BWPs, an identifier of a sidelink BWP, the number of Uu BWPs, and an identifier of a Uu BWP; and/or
the resource pool information includes at least one of the number of resource pools, a type of a resource pool, and an identifier of the resource pool; and/or
the subchannel information includes at least one of a subchannel offset, a reference subchannel, a target subchannel, and a subchannel number; and/or
the sidelink information feedback resource information includes a sidelink information feedback resource configuration parameter; and/or
the user information includes a user identifier; and/or
the transmission type information includes at least one of a transmission type, a transmission identifier, the number of members in one group during multicast, a maximum number of members in one group during multicast, and a multicast feedback mechanism; and/or
the resource scheduling type information includes at least one of static scheduling, dynamic scheduling, and semi-static scheduling; and/or
the transmission manner information includes at least one of: the number of sidelink transport blocks TBs carried in one sidelink transmission, whether sidelink information corresponding to a plurality of sidelink TBs carried in one sidelink transmission is multiplexed, and configuration of a code block group CBG in one sidelink transmission; and/or
the ratio includes a ratio of a target resource to a position, where the target resource is a resource for sending the codebook; and/or the position information includes an identifier of the position corresponding to the target resource for sending the codebook; and/or the resource information includes an identifier of the target resource for sending the codebook, and the identifier of the target resource corresponds to a position; and/or the latency information includes at least one of the following:

a latency between a position of scheduling signaling and a position of sidelink transmission scheduled by using the scheduling signaling;

a latency between a position of scheduling signaling and a position of a sidelink information feedback resource corresponding to a position of sidelink transmission scheduled by using the scheduling signaling;

a latency between a position of scheduling signaling and a target resource corresponding to sidelink transmission scheduled by using the scheduling signaling, where the target resource is a resource for sending the codebook;

a latency between a position of sidelink transmission and a corresponding target resource, where the target resource is a resource for sending the codebook;

a latency between a sidelink information feedback resource and a corresponding target resource, where the target resource is a resource for sending the codebook; and a latency between a position of sidelink transmission and a corresponding sidelink information feedback resource.

Optionally, the structure of the codebook is one codebook, or the structure of the codebook includes at least two sub-codebooks.

Optionally, the structure of the codebook has at least one of the following features:

different transmission manners correspond to different codebooks or sub-codebooks;

different resource scheduling types correspond to different codebooks or sub-codebooks;

different transmission types correspond to different codebooks or sub-codebooks;

different feedback mechanisms correspond to different codebooks or sub-codebooks;

different users correspond to different codebooks or sub-codebooks;

different resource pools correspond to different codebooks or sub-codebooks;

different carriers correspond to different codebooks or sub-codebooks;

different BWPs correspond to different codebooks or sub-codebooks;

different subchannels correspond to different codebooks or sub-codebooks;

different latencies correspond to different codebooks or sub-codebooks;

different sidelink information feedback resource configurations correspond to different codebooks or sub-codebooks;

different ratios correspond to different codebooks or sub-codebooks;

different HARQ processes correspond to different codebooks or sub-codebooks;

different services correspond to different codebooks or sub-codebooks;

different sidelink information sizes correspond to different codebooks or sub-codebooks; and different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs respectively correspond to different codebooks or sub-codebooks.

Optionally, the traversal information of the position corresponding to the codebook is used to determine a sequence correspondence between a bit in the codebook and a position.

Optionally, the traversal information of the position corresponding to the codebook includes a dimension of a traversed position, and the dimension includes at least one of the following:

a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain frequency division multiplexing FDM number, and a feedback mechanism.

Optionally, a bit size of the codebook has at least one of the following conditions:

at least one position on a first resource corresponds to 1 bit in the codebook, and the first resource is a resource corresponding to a transmission manner in which one sidelink TB is carried in one sidelink transmission;

at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a plurality of resources including a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;

at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;

at least one position on a third resource corresponds to a plurality of bits in the codebook, and the third resource is a resource corresponding to a transmission manner in which a CBG of one sidelink TB is carried in one sidelink transmission;

at least one position on a plurality of resources including a third resource corresponds to a plurality of bits in the codebook, and the third resource is a resource corresponding to a transmission manner in which a CBG of one sidelink TB is carried in one sidelink transmission;

at least one position on a fourth resource corresponds to a plurality of bits in the codebook, and the fourth resource is a resource corresponding to a transmission manner in which CBGs of a plurality of sidelink TBs are carried in one sidelink transmission; and at least one position on a plurality of resources including a fourth resource corresponds to a plurality of bits in the codebook, and the fourth resource is a resource corresponding to a transmission manner in which CBGs of a plurality of sidelink TBs are carried in one sidelink transmission.

Optionally, a bit size of the codebook has at least one of the following conditions:

at least one position on a fifth resource corresponds to M bits in the codebook, and the fifth resource is a resource corresponding to a transmission manner in which one sidelink TB is carried in one sidelink transmission;

at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a plurality of resources including a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;

at least one position on a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a plurality of resources including a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;

at least one position on a seventh resource corresponds to B*M bits in the codebook, and the seventh resource is a resource corresponding to a transmission manner in which a CBG of one sidelink TB is carried in one sidelink transmission;

at least one position on a plurality of resources including a seventh resource corresponds to B*M bits in the codebook, and the seventh resource is a resource corresponding to a transmission manner in which a CBG of one sidelink TB is carried in one sidelink transmission;

at least one position on an eighth resource corresponds to C*M bits in the codebook, and the eighth resource is a resource corresponding to a transmission manner in which CBGs of a plurality of sidelink TBs are carried in one sidelink transmission; and at least one position on a plurality of resources including an eighth resource corresponds to C*M bits in the codebook, and the eighth resource is a resource corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

Optionally, the sidelink information includes:
sidelink information fed back by a receiving user; or
sidelink information determined based on a receiving status of receiving sidelink transmission.

Optionally, the sidelink information includes at least one of the following:
a sidelink hybrid automatic repeat request acknowledgement HARQ-ACK, a sidelink scheduling request SR, and sidelink channel state information CSI.

Optionally, the codebook information is determined in at least one of the following manners:
being configured by a control node, being predefined by a protocol, being indicated by another terminal, being negotiated between terminals, and being preconfigured.

Optionally, different codebooks are sent on different target resources.

The foregoing terminal can improve resource utilization.

It should be understood that, in this embodiment of the present disclosure, the radio frequency unit 801 may be configured to receive and send information or a signal in a call process. Specifically, after receiving downlink data from a base station, the radio frequency unit 801 sends the downlink data to the processor 810 for processing. In addition, the radio frequency unit 801 sends uplink data to the base station. Usually, the radio frequency unit 801 includes but is not limited to an antenna, at least one amplifier, a transceiver, a coupler, a low noise amplifier, a duplexer, and the like. In addition, the radio frequency unit 801 may communicate with a network and another device through a wireless communication system.

The terminal provides wireless broadband Internet access for the user by using the network module 802, for example, helping the user to send and receive an e-mail, brows a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the terminal 800. The audio output unit 803 includes a speaker, a buzzer, a telephone receiver, and the like.

The input unit 804 is configured to receive an audio signal or a video signal. The input unit 804 may include a graphics processing unit (GPU) 8041 and a microphone 8042, and the graphics processing unit 8041 processes image data of a still picture or video obtained by an image capture apparatus (such as a camera) in a video capture mode or an image capture mode. A processed image frame may be displayed on the display unit 806. The image frame processed by the graphics processor 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The terminal 800 further includes at least one type of sensor 805, such as a light sensor, a motion sensor, and another sensor. Specifically, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal 800 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for a user. The display unit 806 may include a display panel 8061. The display panel 8061 may be configured in a form of a liquid crystal display (LCD), an organic light-emitting diode (OLED), or the like.

The user input unit 807 may be configured to receive input numeral or character information, and generate key signal input related to user setting and functional control of the terminal. Specifically, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 810, and receives and executes a command sent by the processor 810. In addition, the touch panel 8071 may be of a resistive type, a capacitive type, an infrared type, a surface acoustic wave type, or the like. The user input unit 807 may include another input device 8072 in addition to the touch panel 8071. Specifically, the another input device 8072 may include but is not limited to a physical keyboard, a functional button (such as a volume control button or a power on/off button), a trackball, a mouse, and a joystick. Details are not described herein.

Further, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, although the touch panel 8071 and the display panel 8061 are used as two independent parts to implement input and output functions of the terminal, in some embodiments, the touch panel 8071 and the display panel 8061 may be integrated to implement the input and output functions of the terminal. This is not specifically limited herein.

The interface unit 808 is an interface for connecting an external apparatus with the terminal 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 808 may be configured to receive input (for example, data information and power) from an external apparatus and transmit the received input to one or more elements in the terminal 800 or may be configured to transmit data between the terminal 800 and an external apparatus.

The memory 809 may be configured to store a software program and various data. The memory 809 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 809 may include a high-speed random access memory, and may further include a nonvolatile memory, for example, at least one magnetic disk storage device, a flash storage device, or another volatile solid-state storage device.

The processor 810 is a control center of the terminal, and connects all parts of the entire terminal by using various interfaces and lines. By running or executing a software program and/or a module stored in the memory 809 and invoking data stored in the memory 809, the processor 810 performs various functions of the terminal and data processing, to perform overall monitoring on the terminal. The processor 810 may include one or more processing units. Optionally, an application processor and a modem processor may be integrated into the processor 810. The application processor mainly processes an operating system, a user interface, an application program, and the like. The modem processor mainly processes wireless communications. It can be understood that, alternatively, the modem processor may not be integrated into the processor 810.

The terminal 800 may further include the power supply 811 (such as a battery) that supplies power to each component. Optionally, the power supply 811 may be logically connected to the processor 810 by using a power management system, so as to implement functions such as charging, discharging, and power consumption management by using the power management system.

In addition, the terminal 800 includes some function modules not shown, and details are not described herein.

Optionally, an embodiment of the present disclosure further provides a terminal, including a processor 810, a memory 809, and a computer program that is stored in the memory 809 and that can be run by the processor 810. When the computer program is executed by the processor 810, the foregoing processes of the sidelink information sending method embodiment are implemented and a same technical effect can be achieved. To avoid repetition, details are not described herein again.

Figure 9:
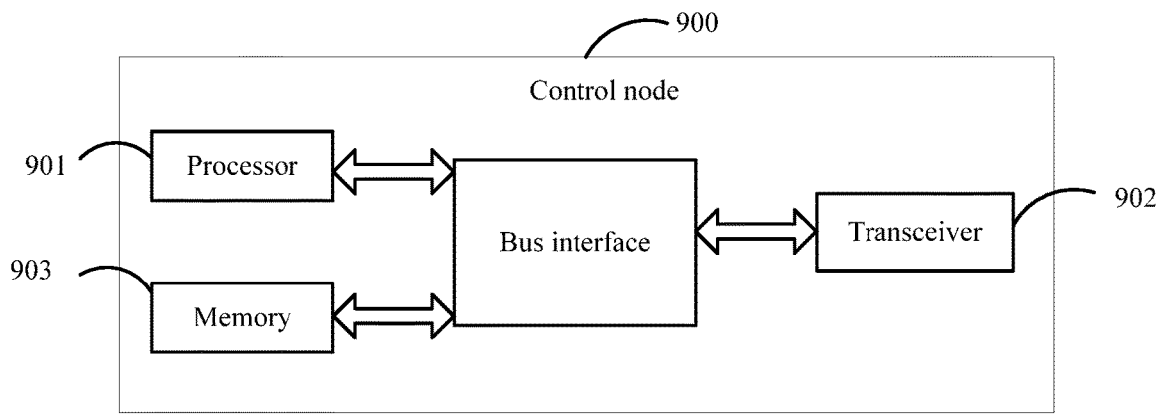
FIG. 9 is a structural diagram of another control node according to an embodiment of the present disclosure.

Referring to FIG. 9, FIG. 9 is a structural diagram of another control node according to an embodiment of the present disclosure. As shown in FIG. 9, a control node 900 includes a processor 901, a transceiver 902, a memory 903, and a bus interface.

The transceiver 902 is configured to receive a codebook, where the codebook is a codebook corresponding to sidelink information. Optionally, the control node is configured to configure codebook information of the codebook, and the codebook information includes at least one of the following information:
a type of a position corresponding to the codebook;
the position corresponding to the codebook;
a structure of the codebook;
traversal information of the position corresponding to the codebook; and
a size of the codebook, where
the position includes at least one of an occasion and a frequency domain position.

Optionally, the type of the position corresponding to the codebook includes at least one of the following:
a position of scheduling signaling used to schedule sidelink transmission;
a position of the sidelink transmission;
a position of the sidelink information; and
a subchannel.

Optionally, the position of the sidelink transmission includes at least one of the following:
a position of sidelink control information SCI in the sidelink transmission and a position of sidelink data in the sidelink transmission; and/or
the subchannel includes at least one of the following:
a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, where Z is an integer greater than 1.

Optionally, the position corresponding to the codebook is determined based on a correspondence, and the correspondence includes a correspondence between the codebook and at least one of the following:
a connection, service information, HARQ process information, carrier information, bandwidth part BWP information, resource pool information, subchannel information, sidelink information feedback resource information, user information, transmission type information, resource scheduling type information, transmission manner information, latency information, a ratio, position information, and resource information.

Optionally, the connection includes at least one of a connection type, a connection number, and a connection identifier; and/or
the service information includes at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
the HARQ process information includes at least one of a sidelink HARQ process number, a sidelink HARQ process identifier, a new radio Uu HARQ process, and a Uu HARQ process identifier; and/or
the carrier information includes at least one of the number of sidelink carriers, an identifier of a sidelink carrier, the number of Uu carriers, and an identifier of a Uu carrier; and/or
the BWP information includes at least one of the number of sidelink BWPs, an identifier of a sidelink BWP, the number of Uu BWPs, and an identifier of a Uu BWP; and/or
the resource pool information includes at least one of the number of resource pools, a type of a resource pool, and an identifier of the resource pool; and/or
the subchannel information includes at least one of a subchannel offset, a reference subchannel, a target subchannel, and a subchannel number; and/or
the sidelink information feedback resource information includes a sidelink information feedback resource configuration parameter; and/or
the user information includes a user identifier; and/or
the transmission type information includes at least one of a transmission type, a transmission identifier, the number of members in one group during multicast, a maximum number of members in one group during multicast, and a multicast feedback mechanism; and/or
the resource scheduling type information includes at least one of static scheduling, dynamic scheduling, and semi-static scheduling; and/or
the transmission manner information includes at least one of: the number of sidelink transport blocks TBs carried in one sidelink transmission, whether sidelink information corresponding to a plurality of sidelink TBs carried in one sidelink transmission is multiplexed, and configuration of a code block group CBG in one sidelink transmission; and/or
the ratio includes a ratio of a target resource to a position, where the target resource is a resource for sending the codebook; and/or
the position information includes an identifier of the position corresponding to the target resource for sending the codebook; and/or
the resource information includes an identifier of the target resource for sending the codebook, and the identifier of the target resource corresponds to a position; and/or
the latency information includes at least one of the following:
a latency between a position of scheduling signaling and a position of sidelink transmission scheduled by using the scheduling signaling;
a latency between a position of scheduling signaling and a position of a sidelink information feedback resource corresponding to a position of sidelink transmission scheduled by using the scheduling signaling;
a latency between a position of scheduling signaling and a target resource corresponding to sidelink transmission scheduled by using the scheduling signaling, where the target resource is a resource for sending the codebook;
a latency between a position of sidelink transmission and a corresponding target resource, where the target resource is a resource for sending the codebook;
a latency between a sidelink information feedback resource and a corresponding target resource, where the target resource is a resource for sending the codebook; and
a latency between a position of sidelink transmission and a corresponding sidelink information feedback resource.

Optionally, the structure of the codebook is one codebook, or the structure of the codebook includes at least two sub-codebooks.

Optionally, the structure of the codebook has at least one of the following features:
different transmission manners correspond to different codebooks or sub-codebooks;
different resource scheduling types correspond to different codebooks or sub-codebooks;
different transmission types correspond to different codebooks or sub-codebooks;

different feedback mechanisms correspond to different codebooks or sub-codebooks;
different users correspond to different codebooks or sub-codebooks;
different resource pools correspond to different codebooks or sub-codebooks;
different carriers correspond to different codebooks or sub-codebooks;
different BWPs correspond to different codebooks or sub-codebooks;
different subchannels correspond to different codebooks or sub-codebooks;
different latencies correspond to different codebooks or sub-codebooks;
different sidelink information feedback resource configurations correspond to different codebooks or sub-codebooks;
different ratios correspond to different codebooks or sub-codebooks;
different HARQ processes correspond to different codebooks or sub-codebooks;
different services correspond to different codebooks or sub-codebooks;
different sidelink information sizes correspond to different codebooks or sub-codebooks; and
different connections correspond to different codebooks or sub-codebooks.

Optionally, in a case that different transmission manners correspond to different codebooks or sub-codebooks, at least two of a transmission manner of being configured as a single sidelink TB, a transmission manner of being configured as a CBG, and a transmission manner of being configured as a plurality of sidelink TBs respectively correspond to different codebooks or sub-codebooks.

Optionally, the traversal information of the position corresponding to the codebook is used to determine a sequence correspondence between a bit in the codebook and a position.

Optionally, the traversal information of the position corresponding to the codebook includes a dimension of a traversed position, and the dimension includes at least one of the following:
 a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain FDM number, and a feedback mechanism.

Optionally, a bit size of the codebook has at least one of the following conditions:
 at least one position on a first resource corresponds to 1 bit in the codebook, and the first resource is a carrier, a BWP, or a resource pool corresponding to a transmission manner in which one sidelink TB is carried in one sidelink transmission;
 at least one position on a second resource correspond to 1 bit in the codebook, the second resource is a carrier, a BWP, or a resource pool corresponding to a transmission manner in which a plurality of sidelink TBs are carried in one sidelink transmission, and sidelink information corresponding to the plurality of sidelink TBs is multiplexed;
 at least one position on a plurality of resources including a second resource correspond to 1 bit in the codebook, the plurality of resources are a plurality of carriers, a plurality of BWPs, and a plurality of resource pools, the second resource is a carrier, a BWP, or a resource pool corresponding to a transmission manner in which a plurality of sidelink TBs are carried in one sidelink transmission, and sidelink information corresponding to the plurality of sidelink TBs is multiplexed;
 at least one position on a second resource correspond to a plurality of bits in the codebook, the second resource is a carrier, a BWP, or a resource pool corresponding to a transmission manner in which a plurality of sidelink TBs are carried in one sidelink transmission, and sidelink information corresponding to the plurality of sidelink TBs is not multiplexed;
 at least one position on a plurality of resources including a second resource correspond to a plurality of bits in the codebook, the plurality of resources are a plurality of carriers, a plurality of BWPs, and a plurality of resource pools, the second resource is a carrier, a BWP, or a resource pool corresponding to a transmission manner in which a plurality of sidelink TBs are carried in one sidelink transmission, and sidelink information corresponding to the plurality of sidelink TBs is not multiplexed;
 at least one position on a third resource corresponds to a plurality of bits in the codebook, and the third resource is a carrier, a BWP, or a resource pool corresponding to a transmission manner in which a CBG of one sidelink TB is carried in one sidelink transmission;
 at least one position on a plurality of resources including a third resource corresponds to a plurality of bits in the codebook, and the third resource is a carrier, a BWP, or a resource pool corresponding to a transmission manner in which a CBG of one sidelink TB is carried in one sidelink transmission;
 at least one position on a fourth resource corresponds to a plurality of bits in the codebook, and the fourth resource is a carrier, a BWP, or a resource pool corresponding to a transmission manner in which CBGs of a plurality of sidelink TBs are carried in one sidelink transmission; and
 at least one position on a plurality of resources including a fourth resource corresponds to a plurality of bits in the codebook, and the fourth resource is a carrier, a BWP, or a resource pool corresponding to a transmission manner in which CBGs of a plurality of sidelink TBs are carried in one sidelink transmission.

Optionally, a bit size of the codebook has at least one of the following conditions:
 at least one position on a fifth resource corresponds to M bits in the codebook, and the fifth resource is a carrier, a BWP, or a resource pool corresponding to a transmission manner in which one sidelink TB is carried in one sidelink transmission;
 at least one position on a sixth resource correspond to M bits in the codebook, the sixth resource is a carrier, a BWP, or a resource pool corresponding to a transmission manner in which a plurality of sidelink TBs are carried in one sidelink transmission, and sidelink information corresponding to the plurality of sidelink TBs is multiplexed;
 at least one position on a plurality of resources including a sixth resource correspond to M bits in the codebook, the plurality of resources are a plurality of carriers, a plurality of BWPs, and a plurality of resource pools, the sixth resource is a carrier, a BWP, or a resource pool corresponding to a transmission manner in which a plurality of sidelink TBs are carried in one sidelink transmission, and sidelink information corresponding to the plurality of sidelink TBs is multiplexed;

at least one position on a sixth resource correspond to A*M bits in the codebook, the sixth resource is a carrier, a BWP, or a resource pool corresponding to a transmission manner in which a plurality of sidelink TBs are carried in one sidelink transmission, and sidelink information corresponding to the plurality of sidelink TBs is not multiplexed;

at least one position on a plurality of resources including a sixth resource correspond to A*M bits in the codebook, the plurality of resources are a plurality of carriers, a plurality of BWPs, and a plurality of resource pools, the sixth resource is a carrier, a BWP, or a resource pool corresponding to a transmission manner in which a plurality of sidelink TBs are carried in one sidelink transmission, and sidelink information corresponding to the plurality of sidelink TBs is not multiplexed;

at least one position on a seventh resource corresponds to B*M bits in the codebook, and the seventh resource is a carrier, a BWP, or a resource pool corresponding to a transmission manner in which a CBG of one sidelink TB is carried in one sidelink transmission;

at least one position on a plurality of resources including a seventh resource corresponds to B*M bits in the codebook, and the seventh resource is a carrier, a BWP, or a resource pool corresponding to a transmission manner in which a CBG of one sidelink TB is carried in one sidelink transmission;

at least one position on an eighth resource corresponds to C*M bits in the codebook, and the eighth resource is a carrier, a BWP, or a resource pool corresponding to a transmission manner in which CBGs of a plurality of sidelink TBs are carried in one sidelink transmission; and at least one position on a plurality of resources including an eighth resource corresponds to C*M bits in the codebook, and the eighth resource is a carrier, a BWP, or a resource pool corresponding to a transmission manner in which CBGs of a plurality of sidelink TBs are carried in one sidelink transmission, where A is an integer greater than 1, B is an integer greater than 1, C is an integer greater than 1, and M is an integer greater than 1.

Optionally, the sidelink information includes:
sidelink information fed back by a receiving user; or
sidelink information determined based on a receiving status of receiving sidelink transmission.

Optionally, the sidelink information includes at least one of the following:
a sidelink HARQ-ACK, a sidelink SR, and sidelink channel state information CSI.

Optionally, different codebooks are received on different target resources.

The foregoing control node can improve resource utilization.

The transceiver 902 is configured to receive and send data under the control of the processor 901. The transceiver 902 includes at least two antenna ports.

In FIG. 9, a bus architecture may include any number of interconnected buses and bridges. Specifically, various circuits of one or more processors represented by the processor 901 and a memory represented by the memory 903 are interconnected. The bus architecture may further link various other circuits such as a peripheral device, a voltage regulator, and a power management circuit. These are well known in the art, and therefore are not further described in this specification. A bus interface provides an interface. The transceiver 902 may be a plurality of components. To be specific, the transceiver 902 includes a transmitter and a receiver, and provides a unit configured to communicate with various other apparatuses on a transmission medium. For different user equipment, a user interface 904 may be an interface that can externally or internally connect to a needed device, and the connected device includes but is not limited to a keypad, a display, a loudspeaker, a microphone, and a joystick.

The processor 901 is responsible for bus architecture management and general processing. The memory 903 may store data used by the processor 901 when the processor 901 performs an operation.

Optionally, an embodiment of the present disclosure further provides a control node, including a processor 901, a memory 903, and a computer program that is stored in the memory 903 and that can be run by the processor 901. When the computer program is executed by the processor 901, the processes of the foregoing sidelink information receiving method embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the steps of the sidelink information sending method provided in the embodiments of the present disclosure are implemented, or when the program is executed by a processor, the steps of the sidelink information receiving method provided in the embodiments of the present disclosure are implemented, and a same technical effect can be achieved. To avoid repetition, details are not described herein again. The computer-readable storage medium includes a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A sidelink information sending method, applied to a terminal and comprising:
   obtaining a codebook corresponding to sidelink information based on codebook information, wherein the codebook information comprises a type of a position corresponding to the codebook, and the type of the position corresponding to the codebook comprises an occasion of a physical sidelink feedback channel (PSFCH); and
   sending the codebook to a control node through a physical uplink control channel (PUCCH) or a physical uplink shared channel (PUSCH),
   wherein the position corresponding to the codebook is determined based on a correspondence between the codebook and latency information, and the latency information comprises:
   a latency between a position of scheduling signaling and a position of sidelink transmission scheduled by the scheduling signaling; and
   a latency between a sidelink information feedback resource and a corresponding target resource, wherein the target resource is a resource for sending the codebook.

2. The method according to claim 1, wherein the codebook information further comprises at least one of the following information:
   the position corresponding to the codebook;
   a structure of the codebook;
   traversal information of the position corresponding to the codebook; and
   a size of the codebook, wherein
   the position comprises at least one of an occasion and a frequency domain position.

3. The method according to claim 2, wherein the type of the position corresponding to the codebook further comprises at least one of the following:
   a position of scheduling signaling used to schedule sidelink transmission;
   a position of the sidelink transmission;
   a position of the sidelink information; and
   a subchannel.

4. The method according to claim 3, wherein the position of the sidelink transmission comprises at least one of the following:
   a position of sidelink control information (SCI) in the sidelink transmission and a position of sidelink data in the sidelink transmission; and/or
   the subchannel comprises at least one of the following:
   a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, wherein Z is an integer greater than 1.

5. The method according to claim 2, wherein the correspondence further comprises a correspondence between the codebook and at least one of the following:
   a connection, service information, hybrid automatic repeat request (HARQ) process information, carrier information, bandwidth part (BWP) information, resource pool information, subchannel information, sidelink information feedback resource information, user information, transmission type information, resource scheduling type information, transmission manner information, a ratio, position information, and resource information.

6. The method according to claim 5, wherein the connection comprises at least one of a connection type, a connection number, and a connection identifier; and/or
   the service information comprises at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or
   the HARQ process information comprises at least one of a sidelink HARQ process number, a sidelink HARQ process identifier, a Uu HARQ process, and a Uu HARQ process identifier; and/or
   the carrier information comprises at least one of the number of sidelink carriers, an identifier of a sidelink carrier, the number of Uu carriers, and an identifier of a Uu carrier; and/or
   the BWP information comprises at least one of the number of sidelink BWPs, an identifier of a sidelink BWP, the number of Uu BWPs, and an identifier of a Uu BWP; and/or
   the resource pool information comprises at least one of the number of resource pools, a type of a resource pool, and an identifier of the resource pool; and/or
   the subchannel information comprises at least one of a subchannel offset, a reference subchannel, a target subchannel, and a subchannel number; and/or
   the sidelink information feedback resource information comprises a sidelink information feedback resource configuration parameter, and the sidelink information feedback resource configuration parameter comprises a period N of the occasion of the PSFCH; and/or
   the user information comprises a user identifier; and/or
   the transmission type information comprises at least one of a transmission type, a transmission identifier, the number of members in one group during multicast, a maximum number of members in one group during multicast, and a multicast feedback mechanism; and/or
   the resource scheduling type information comprises at least one of static scheduling, dynamic scheduling, and semi-static scheduling; and/or
   the transmission manner information comprises at least one of: the number of sidelink transport blocks (TB) carried in one sidelink transmission, whether sidelink information corresponding to a plurality of sidelink TBs carried in one sidelink transmission is multiplexed, and a code block group (CBG) configuration in one sidelink transmission; and/or
   the ratio comprises a ratio of a target resource to a position, wherein the target resource is a resource for sending the codebook; and/or
   the position information comprises an identifier of the position corresponding to the target resource for sending the codebook; and/or
   the resource information comprises an identifier of the target resource for sending the codebook, and the identifier of the target resource corresponds to a position; and/or the latency information further comprises at least one of the following:
- a latency between a position of scheduling signaling and a position of a sidelink information feedback resource corresponding to a position of sidelink transmission scheduled by using the scheduling signaling;
- a latency between a position of scheduling signaling and a target resource corresponding to sidelink transmission scheduled by using the scheduling signaling, wherein the target resource is a resource for sending the codebook;
- a latency between a position of sidelink transmission and a corresponding target resource, wherein the target resource is a resource for sending the codebook; and
- a latency between a position of sidelink transmission and a corresponding sidelink information feedback resource.

7. The method according to claim 2, wherein the structure of the codebook has at least one of the following features:
- different transmission manners correspond to different codebooks or sub-codebooks, wherein HARQ-ACK information corresponding to semi-static scheduling and HARQ-ACK information corresponding to dynamic scheduling belong to different codebooks or sub-codebooks;
- different resource scheduling types correspond to different codebooks or sub-codebooks;
- different transmission types correspond to different codebooks or sub-codebooks;
- different feedback mechanisms correspond to different codebooks or sub-codebooks;
- different users correspond to different codebooks or sub-codebooks;
- different resource pools correspond to different codebooks or sub-codebooks;
- different carriers correspond to different codebooks or sub-codebooks;
- different BWPs correspond to different codebooks or sub-codebooks;
- different subchannels correspond to different codebooks or sub-codebooks;
- different latencies correspond to different codebooks or sub-codebooks;
- different sidelink information feedback resource configurations correspond to different codebooks or sub-codebooks;
- different ratios correspond to different codebooks or sub-codebooks;
- different HARQ processes correspond to different codebooks or sub-codebooks;
- different services correspond to different codebooks or sub-codebooks;
- different sidelink information sizes correspond to different codebooks or sub-codebooks; and
- different connections correspond to different codebooks or sub-codebooks.

8. The method according to claim 2, wherein the traversal information of the position corresponding to the codebook is used to determine a sequence correspondence between a bit in the codebook and a position.

9. The method according to claim 2, wherein the traversal information of the position corresponding to the codebook comprises a dimension of a traversed position, and the dimension comprises at least one of the following:
- a connection, a service, a HARQ process, a carrier, a BWP, a resource pool, a subchannel, a sidelink information feedback resource, scheduling, a user, a transmission type, a resource identifier, a resource scheduling type, a transmission manner, a latency, a ratio, a position, a position frequency domain frequency division multiplexing (FDM) number, and a feedback mechanism.

10. The method according to claim 2, wherein a bit size of the codebook has at least one of the following conditions:
- at least one position on a first resource corresponds to 1 bit in the codebook, and the first resource is a resource corresponding to a transmission manner in which one sidelink TB is carried in one sidelink transmission;
- at least one position on a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
- at least one position on a plurality of resources comprising a second resource correspond to 1 bit in the codebook, the second resource is a resource corresponding to a transmission manner in which a plurality of sidelink TBs are carried in one sidelink transmission, and sidelink information corresponding to the plurality of sidelink TBs is multiplexed;
- at least one position on a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
- at least one position on a plurality of resources comprising a second resource correspond to a plurality of bits in the codebook, the second resource is a resource corresponding to a transmission manner in which a plurality of sidelink TBs are carried in one sidelink transmission, and sidelink information corresponding to the plurality of sidelink TBs is not multiplexed;
- at least one position on a third resource corresponds to a plurality of bits in the codebook, and the third resource is a resource corresponding to a transmission manner in which a CBG of one sidelink TB is carried in one sidelink transmission;
- at least one position on a plurality of resources comprising a third resource corresponds to a plurality of bits in the codebook, and the third resource is a resource corresponding to a transmission manner in which a CBG of one sidelink TB is carried in one sidelink transmission;
- at least one position on a fourth resource corresponds to a plurality of bits in the codebook, and the fourth resource is a resource corresponding to a transmission manner in which CBGs of a plurality of sidelink TBs are carried in one sidelink transmission; and
- at least one position on a plurality of resources comprising a fourth resource corresponds to a plurality of bits in the codebook, and the fourth resource is a resource corresponding to a transmission manner in which CBGs of a plurality of sidelink TBs are carried in one sidelink transmission.

11. The method according to claim 2, wherein a bit size of the codebook has at least one of the following conditions:
- at least one position on a fifth resource corresponds to M bits in the codebook, and the fifth resource is a resource corresponding to a transmission manner in which one sidelink TB is carried in one sidelink transmission;
- at least one position on a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
at least one position on a plurality of resources comprising a sixth resource correspond to M bits in the codebook, the sixth resource is a resource corresponding to a transmission manner in which a plurality of sidelink TBs are carried in one sidelink transmission, and sidelink information corresponding to the plurality of sidelink TBs is multiplexed;
at least one position on a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;
at least one position on a plurality of resources comprising a sixth resource correspond to A*M bits in the codebook, the sixth resource is a resource corresponding to a transmission manner in which a plurality of sidelink TBs are carried in one sidelink transmission, and sidelink information corresponding to the plurality of sidelink TBs is not multiplexed;
at least one position on a seventh resource corresponds to B*M bits in the codebook, and the seventh resource is a resource corresponding to a transmission manner in which a CBG of one sidelink TB is carried in one sidelink transmission;
at least one position on a plurality of resources comprising a seventh resource corresponds to B*M bits in the codebook, and the seventh resource is a resource corresponding to a transmission manner in which a CBG of one sidelink TB is carried in one sidelink transmission;
at least one position on an eighth resource corresponds to C*M bits in the codebook, and the eighth resource is a resource corresponding to a transmission manner in which CBGs of a plurality of sidelink TBs are carried in one sidelink transmission; and
at least one position on a plurality of resources comprising an eighth resource corresponds to C*M bits in the codebook, and the eighth resource is a resource corresponding to a transmission manner in which CBGs of a plurality of sidelink TBs are carried in one sidelink transmission, wherein
A is an integer greater than 1, B is an integer greater than 1, C is an integer greater than 1, and M is an integer greater than 1.

12. The method according to claim 1, wherein the sidelink information comprises at least one of the following:
sidelink information fed back by a receiving user;
sidelink information determined based on a receiving status of receiving sidelink transmission;
a sidelink hybrid automatic repeat request acknowledgement (HARQ-ACK);
a sidelink scheduling request (SR);
sidelink channel state information (CSI).

13. A sidelink information receiving method, applied to a control node and comprising:
configuring codebook information of sidelink information for a terminal, wherein the codebook information comprises a type of a position corresponding to the codebook, and the type of the position corresponding to the codebook comprises an occasion of a physical sidelink feedback channel (PSFCH); and
receiving a codebook from a terminal through a physical uplink control channel (PUCCH) or a physical uplink shared channel (PUSCH), wherein the codebook is corresponding to sidelink information,
wherein the position corresponding to the codebook is determined based on a correspondence between the codebook and latency information, and the latency information comprises:
a latency between a position of scheduling signaling and a position of sidelink transmission scheduled by the scheduling signaling;
a latency between a sidelink information feedback resource and a corresponding target resource, wherein the target resource is a resource for sending the codebook.

14. The method according to claim 13, wherein the codebook information further comprises at least one of the following information:
the position corresponding to the codebook;
a structure of the codebook;
traversal information of the position corresponding to the codebook; and
a size of the codebook, wherein
the position comprises at least one of an occasion and a frequency domain position.

15. The method according to claim 14, wherein the type of the position corresponding to the codebook further comprises at least one of the following:
a position of scheduling signaling used to schedule sidelink transmission;
a position of the sidelink transmission;
a position of the sidelink information; and
a subchannel.

16. The method according to claim 15, wherein the position of the sidelink transmission comprises at least one of the following:
a position of sidelink control information (SCI) in the sidelink transmission and a position of sidelink data in the sidelink transmission; and/or
the subchannel comprises at least one of the following:
a start subchannel for the sidelink transmission, an end subchannel for the sidelink transmission, a center subchannel in frequency domain occupied by the sidelink transmission, and a $Z^{th}$ subchannel in frequency domain occupied by the sidelink transmission, wherein Z is an integer greater than 1.

17. The method according to claim 14, wherein the correspondence further comprises a correspondence between the codebook and at least one of the following:
a connection, service information, HARQ process information, carrier information, bandwidth part (BWP) information, resource pool information, subchannel information, sidelink information feedback resource information, user information, transmission type information, resource scheduling type information, transmission manner information, a ratio, position information, and resource information.

18. The method according to claim 17, wherein the connection comprises at least one of a connection type, a connection number, and a connection identifier; and/or
the service information comprises at least one of an identifier of a sidelink service, a periodicity of the sidelink service, a priority corresponding to the sidelink service, a data rate of the sidelink service, a communication range of the sidelink service, reliability of the sidelink service, a latency requirement of the sidelink service, and a data volume of the sidelink service; and/or the HARQ process information comprises at least one of a sidelink HARQ process number, a sidelink HARQ process identifier, a new radio Uu HARQ process, and a Uu HARQ process identifier; and/or the carrier information comprises at least one of the number of sidelink carriers, an identifier of a sidelink carrier, the number of Uu carriers, and an identifier of a Uu carrier; and/or the BWP information comprises at least one of the number of sidelink BWPs, an identifier of a sidelink BWP, the number of Uu BWPs, and an identifier of a Uu BWP; and/or the resource pool information comprises at least one of the number of resource pools, a type of a resource pool, and an identifier of the resource pool; and/or the subchannel information comprises at least one of a subchannel offset, a reference subchannel, a target subchannel, and a subchannel number; and/or the sidelink information feedback resource information comprises a sidelink information feedback resource configuration parameter, and the sidelink information feedback resource configuration parameter comprises a period N of the occasion of the PSFCH; and/or the user information comprises a user identifier; and/or the transmission type information comprises at least one of a transmission type, a transmission identifier, the number of members in one group during multicast, a maximum number of members in one group during multicast, and a multicast feedback mechanism; and/or the resource scheduling type information comprises at least one of static scheduling, dynamic scheduling, and semi-static scheduling; and/or the transmission manner information comprises at least one of: the number of sidelink transport blocks (TB) carried in one sidelink transmission, whether sidelink information corresponding to a plurality of sidelink TBs carried in one sidelink transmission is multiplexed, and a code block group (CBG) configuration in one sidelink transmission; and/or the ratio comprises a ratio of a target resource to a position, wherein the target resource is a resource for sending the codebook; and/or the position information comprises an identifier of the position corresponding to the target resource for sending the codebook; and/or the resource information comprises an identifier of the target resource for sending the codebook, and the identifier of the target resource corresponds to a position; and/or the latency information further comprises at least one of the following:

a latency between a position of scheduling signaling and a position of a sidelink information feedback resource corresponding to a position of sidelink transmission scheduled by using the scheduling signaling;

a latency between a position of scheduling signaling and a target resource corresponding to sidelink transmission scheduled by using the scheduling signaling, wherein the target resource is a resource for sending the codebook;

a latency between a position of sidelink transmission and a corresponding target resource, wherein the target resource is a resource for sending the codebook; and a latency between a position of sidelink transmission and a corresponding sidelink information feedback resource.

19. The method according to claim 14, wherein the structure of the codebook has at least one of the following features:

different transmission manners correspond to different codebooks or sub-codebooks, wherein HARQ-ACK information corresponding to semi-static scheduling and HARQ-ACK information corresponding to dynamic scheduling belong to different codebooks or sub-codebooks;

different resource scheduling types correspond to different codebooks or sub-codebooks;

different transmission types correspond to different codebooks or sub-codebooks;

different feedback mechanisms correspond to different codebooks or sub-codebooks;

different users correspond to different codebooks or sub-codebooks;

different resource pools correspond to different codebooks or sub-codebooks;

different carriers correspond to different codebooks or sub-codebooks;

different BWPs correspond to different codebooks or sub-codebooks;

different subchannels correspond to different codebooks or sub-codebooks;

different latencies correspond to different codebooks or sub-codebooks;

different sidelink information feedback resource configurations correspond to different codebooks or sub-codebooks;

different ratios correspond to different codebooks or sub-codebooks;

different HARQ processes correspond to different codebooks or sub-codebooks;

different services correspond to different codebooks or sub-codebooks;

different sidelink information sizes correspond to different codebooks or sub-codebooks; and different connections correspond to different codebooks or sub-codebooks.

20. A terminal, comprising a memory, a processor, and a program that is stored in the memory and that can be run by the processor, wherein when the program is executed by the processor, following steps of a sidelink information sending method are implemented:

obtaining a codebook corresponding to sidelink information based on codebook information, wherein the codebook information comprises a type of a position corresponding to the codebook and the type of the position corresponding to the codebook comprises an occasion of a physical sidelink feedback channel (PSFCH); and sending the codebook to a control node through a physical uplink control channel (PUCCH) or a physical uplink shared channel (PUSCH), wherein the position corresponding to the codebook is determined based on a correspondence between the codebook and latency information, and the latency information comprises:

a latency between a position of scheduling signaling and a position of sidelink transmission scheduled by the scheduling signaling;

a latency between a sidelink information feedback resource and a corresponding target resource, wherein the target resource is a resource for sending the codebook.

* * * * *